(12) United States Patent
Dinicola et al.

(10) Patent No.: US 12,367,236 B2
(45) Date of Patent: Jul. 22, 2025

(54) DISTRIBUTION BACKBONE

(71) Applicants: SONY GROUP CORPORATION, Tokyo (JP); SONY PICTURES ENTERTAINMENT INC., Culver City, CA (US)

(72) Inventors: Rick Dinicola, La Crescenta, CA (US); David Rosen, Santa Monica, CA (US); Ryan Kido, Westlake Village, CA (US); Tatsuya Oiye, Los Angeles, CA (US); Keith Stevens, Los Angeles, CA (US)

(73) Assignees: SONY GROUP CORPORATION, Tokyo (JP); SONY PICTURES ENTERTAINMENT INC., Culver City, CA (US)

( * ) Notice: Subject to any disclaimer, the term of this patent is extended or adjusted under 35 U.S.C. 154(b) by 159 days.

(21) Appl. No.: 17/214,089

(22) Filed: Mar. 26, 2021

(65) Prior Publication Data
US 2021/0216607 A1   Jul. 15, 2021

Related U.S. Application Data

(63) Continuation of application No. 12/814,395, filed on Jun. 11, 2010, now abandoned.

(60) Provisional application No. 61/186,791, filed on Jun. 12, 2009.

(51) Int. Cl.
*G06F 16/70* (2019.01)
*G06F 17/00* (2019.01)
*G06F 21/10* (2013.01)
*G06Q 10/06* (2023.01)
*G06Q 30/02* (2023.01)

(52) U.S. Cl.
CPC .............. *G06F 16/70* (2019.01); *G06F 17/00* (2013.01); *G06F 21/10* (2013.01); *G06Q 10/06* (2013.01); *G06Q 30/02* (2013.01); *Y02P 90/80* (2015.11)

(58) Field of Classification Search
CPC ............................................... G06F 16/70–787
See application file for complete search history.

(56) References Cited

U.S. PATENT DOCUMENTS

| 6,983,371 | B1 * | 1/2006 | Hurtado | G06F 21/10 726/28 |
| 8,107,452 | B1 * | 1/2012 | Upadhyay | H04W 84/12 370/401 |
| 2002/0112171 | A1 * | 8/2002 | Ginter | G06Q 40/04 375/E7.009 |
| 2005/0256941 | A1 * | 11/2005 | Armstrong | H04L 67/01 709/219 |

(Continued)

*Primary Examiner* — Jay Huang
(74) *Attorney, Agent, or Firm* — Procopio, Cory, Hargreaves & Savitch LLP

(57) ABSTRACT

Digitally distributing media content using a distribution backbone system, including: receiving a request for media content from a client, the request including a client profile; performing inventory and analysis of source assets by iteratively progressing through the client profile to create output; performing a capability mapping in which a series of rules that allow the source assets to be mapped to the client profile; and planning a manufacturing process, which determines work items and execution steps from capabilities mapped in response to the request for media content from the client.

11 Claims, 22 Drawing Sheets

(56) References Cited

U.S. PATENT DOCUMENTS

| | | | |
|---|---|---|---|
| 2008/0046980 A1* | 2/2008 | Peng | H04L 67/306 |
| | | | 726/4 |
| 2008/0274687 A1* | 11/2008 | Roberts | H04N 21/47202 |
| | | | 455/3.06 |
| 2009/0063280 A1 | 3/2009 | Wurster | |
| 2009/0165037 A1* | 6/2009 | Van De Pol | H04N 21/85406 |
| | | | 725/32 |

* cited by examiner

| Field | Value |
|---|---|
| Aspect | 16x9 LB 2.20:1 |
| Aspect | 16x9 LB 2.35 |
| Aspect | 16x9 LB 2.40 |
| Aspect | 16x9 LB 2.55:1 |
| Aspect | 16x9 M 1.85 |
| Aspect | 16x9 SM 1.33 |
| Aspect | 16x9 SM 1.66 |

FIG. 16

DISTRIBUTION BACKBONE

CROSS-REFERENCE TO RELATED APPLICATIONS

The present application is a continuation application of co-pending U.S. patent application Ser. No. 12/814,395 (filed Jun. 11, 2010), which claimed the benefit of priority under 35 U.S.C. § 119 (e) of U.S. Provisional Patent Application No. 61/186,791, filed Jun. 12, 2009, entitled "Distribution Backbone." The disclosures of the above-referenced applications are incorporated herein by reference.

BACKGROUND

Field of the Invention

The present invention relates to digital media, and more specifically, to digital distribution of media.

Background

With production and distribution of media rapidly moving towards entirely digital, it would be advantageous to provide for automated workflow and compatibility of various digital formats/devices, which require the integration of both software and hardware. However, there are several obstacles to providing automated workflow and compatibility of various digital formats/devices in the field of media production. For example, currently, there is an absence of integrated workflow, a lack of standards, disparate software and hardware solutions, and a general absence of a drive to replace the manual nature of the workflow.

SUMMARY

Embodiments of the present invention provide for digitally distributing media content using a distribution backbone system.

In one implementation, a method of digitally distributing media content using a distribution backbone system is disclosed. The method includes: receiving a request for media content from a client, the request including a client profile; performing inventory and analysis of source assets by iteratively progressing through the client profile to create output; performing a capability mapping in which a series of rules that allow the source assets to be mapped to the client profile; and planning a manufacturing process, which determines work items and execution steps from capabilities mapped in response to the request for media content from the client.

In another implementation, a distribution backbone system is disclosed. The system includes: a manufacturing analysis engine to receive a request for media content from a client, including a client profile, wherein the manufacturing analysis operates to perform inventory and analysis of source assets by iteratively progressing through the client profile to generate an analysis output; and a manufacturing planning engine configured to determine work items and execution steps using the analysis output.

In yet another implementation, a computer-readable storage medium storing a computer program for digitally distributing media content is disclosed. The computer program includes executable instructions that cause a computer to: receive a request for media content from a client, the request including a client profile; perform inventory and analysis of source assets by iteratively progressing through the client profile to create output; perform a capability mapping in which a series of rules that allow the source assets to be mapped to the client profile; and plan a manufacturing process, which determines work items and execution steps from capabilities mapped in response to the request for media content from the client.

Other features and advantages of the present invention will become more readily apparent to those of ordinary skill in the art after reviewing the following detailed description and accompanying drawings.

BRIEF DESCRIPTION OF THE DRAWINGS

FIG. 16 shows a list of Aspect Ratio values that the asset would be limited to if it were to be a considered for this Component Type.

DETAILED DESCRIPTION

Implementations as disclosed herein describe systems, methods, and apparatus for digital content distribution which provide an automated workflow that ingests content digitally and manages it seamlessly through delivery to a client. After reading this description it will become apparent how to implement the invention in various alternative implementations and alternative applications. However, although various implementations of the present invention will be described herein, it is understood that these implementations are presented by way of example only, and not limitation. As such, this detailed description of various alternative implementations should not be construed to limit the scope or breadth of the present invention.

Figure 1:
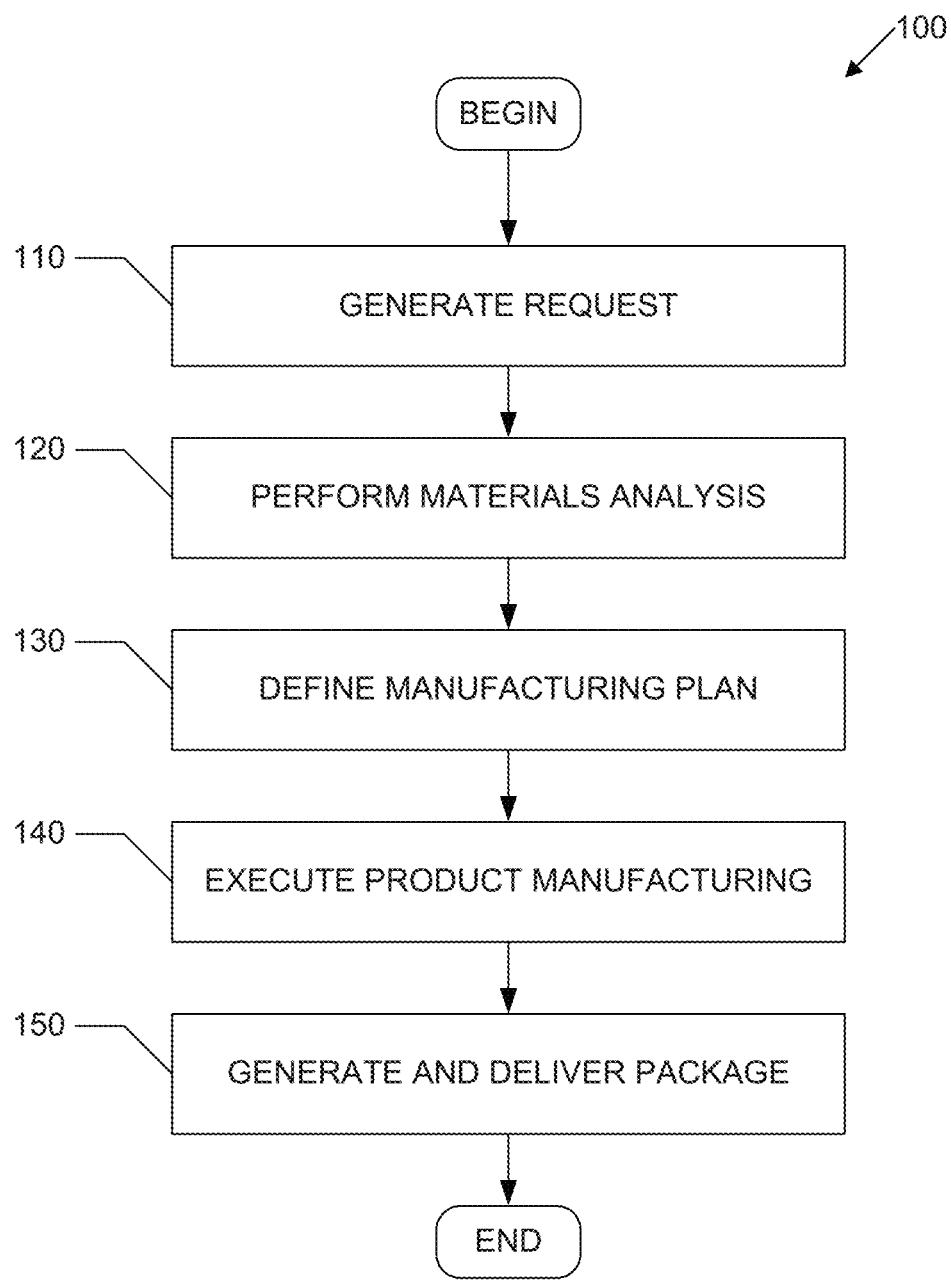
FIG. 1 is a flow diagram illustrating a process for digital distribution of media content using a distribution backbone system in accordance with one implementation of the present invention.

FIG. 1 is a flow diagram 100 illustrating a process for digital distribution of media content using a distribution backbone system in accordance with one implementation of the present invention. Examples of media content include movies, songs, software, and games.

In the illustrated implementation of FIG. 1, requests are generated and submitted, at box 110, for the licensing of content and for the fulfillment of that content to licensees. These requests take many forms based on the variation of submitting organizations and the types of licensing agreements. The fulfilling operation performs the necessary analysis to identify key information regarding the identification of the content (referred to as Title/Alpha), the client to be serviced, and the terms of serving such as due date.

The next step in the fulfillment process is an analysis of inventory requirements, at box 120. To generate a manufacturing plan that will result in the creation of deliverables needed by the licensee, an analysis of the inventory is conducted for each Title/Alpha. This analysis begins with the definition of the final deliverables required by the licensee (i.e., product) and processes through each level of the components used to generate the product from the duplication master to discrete video, audio, and text components to the original master created by production. For each client requirement, this process, in various forms is undertaken either by the servicing operation or a supplier.

For each Title/Alpha, once the status of inventory is known, a manufacturing plan is defined and generated, at box 130. This plan can involve a small number of steps such as for a duplicate and ship requirement or can require more complex manufacturing that could involve processes such as down conversion, audio playback, and subtitle application prior to the duplication and shipment. The manufacturing plan is determined based on the existing inventory components and knowledge of the manufacturing workflow. Inventory analysis and manufacturing planning are described below in detail.

Once the manufacturing plan is approved, it is released for execution, at box 140. This process involves procurement related activities or in-house manufacturing including automated management of content processing technologies, such as file management, transcoding, packaging, and delivery, controlled by standardized data interfaces.

The packaging and delivery process (performed at box 150) supports the continued automation of the fulfillment process. Products are delivered to an exacting standard with supporting media and metadata so that they can be consumed by client's content management system. The variation of these standards requires flexibility in the management of information and supporting media.

Figure 2:
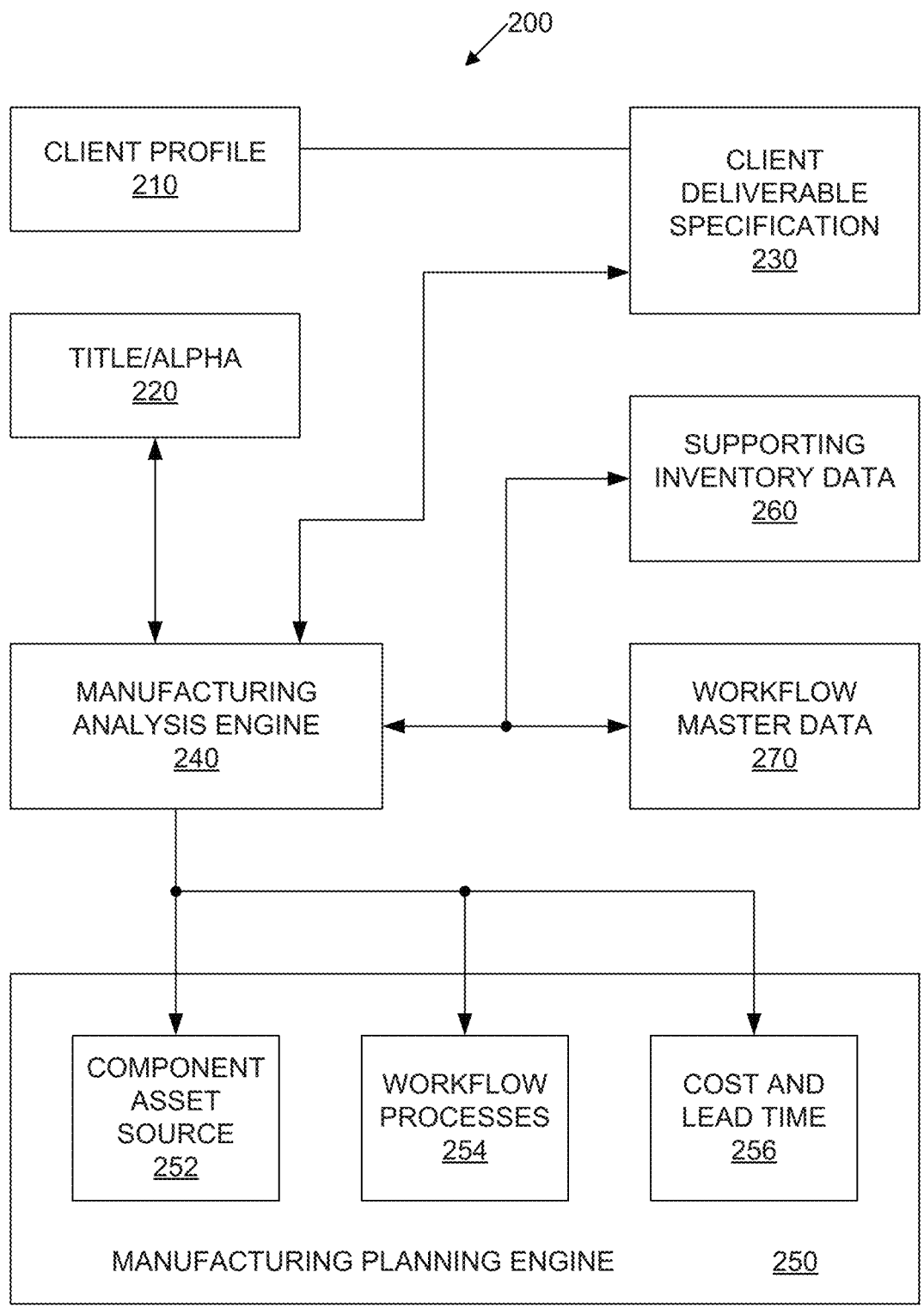
FIG. 2 is a block diagram of a distribution backbone system in accordance with one implementation of the present invention.

FIG. 2 is a block diagram of a distribution backbone system 200 in accordance with one implementation of the present invention. In the illustrated implementation of FIG. 2, the block diagram illustrates entities and processes needed to perform materials analysis and generate a manufacturing plan. Thus, the distribution backbone system 200 includes a client deliverable specification 230 (including a client profile 210), a manufacturing analysis engine 240, a manufacturing planning engine 250, supporting inventory data 260, and workflow master data 270. The manufacturing planning engine 250 performs or uses component asset source 252, workflow processes 252, and cost and lead time analysis 256.

In one implementation, the automated workflow is supported by master data 270 (see Appendix 5 for a detailed description), which is maintained across several inventory and content processing workflows. The manufacturing planning engine 250 utilizes this master data 270 to generate specific manufacturing plans in response to requests from clients. These manufacturing plans represent the core instruction set to manage content processing and generate the information points required for cost and lead time estimation.

The manufacturing analysis engine 240 utilizes workflow master data 270 and supporting inventory data 260 (see Appendix 4 for a detailed description) along with input from a request module (see Appendix 2 for a detailed description), which deals with partner-client relationships and how requests are generated. Using the client deliverable specification 230, the manufacturing analysis engine 240 identifies the appropriate workflow. Within the workflow all tasks needed to create the client specification are defined. Further, all needed component types for each task are defined where applicable. With this information, the engine 240 first performs a materials analysis. The distribution backbone system 200 queries inventory for the needed components for the specified Title/Alpha 220 and client deliverable specification 230. The results of this analysis determine the tasks that are necessary to complete the workflow required.

As described in Appendix 5, client specification-based workflows should account for inventory scenarios. These workflows should cover encode and ingest of needed inventory component through to delivery. They should be modular in nature and provide flexibility to handle scenarios where needed inventory is at greater stages of readiness. The manufacturing analysis engine 240 performs a materials analysis in order to determine the specific workflows necessary to create the needed product.

A distribution backbone workflow may include a transcoding of a higher resolution file to a lower resolution file which is then packaged and delivered. Further, distribution backbone operations may create the lower resolution file and store it in the file storage system as a limited use alternate resolution master. In this case, a workflow will be required to interrogate inventory, determine that the lower resolution file is present and choose an alternate workflow to copy and deliver the lower resolution file rather than transcode from a higher resolution file.

Depending on detailed design it may be necessary to re-run the manufacturing plan for cost and lead time purposes prior to executing the actual workflows because of the dynamic nature of the asset inventory.

Figure 3:
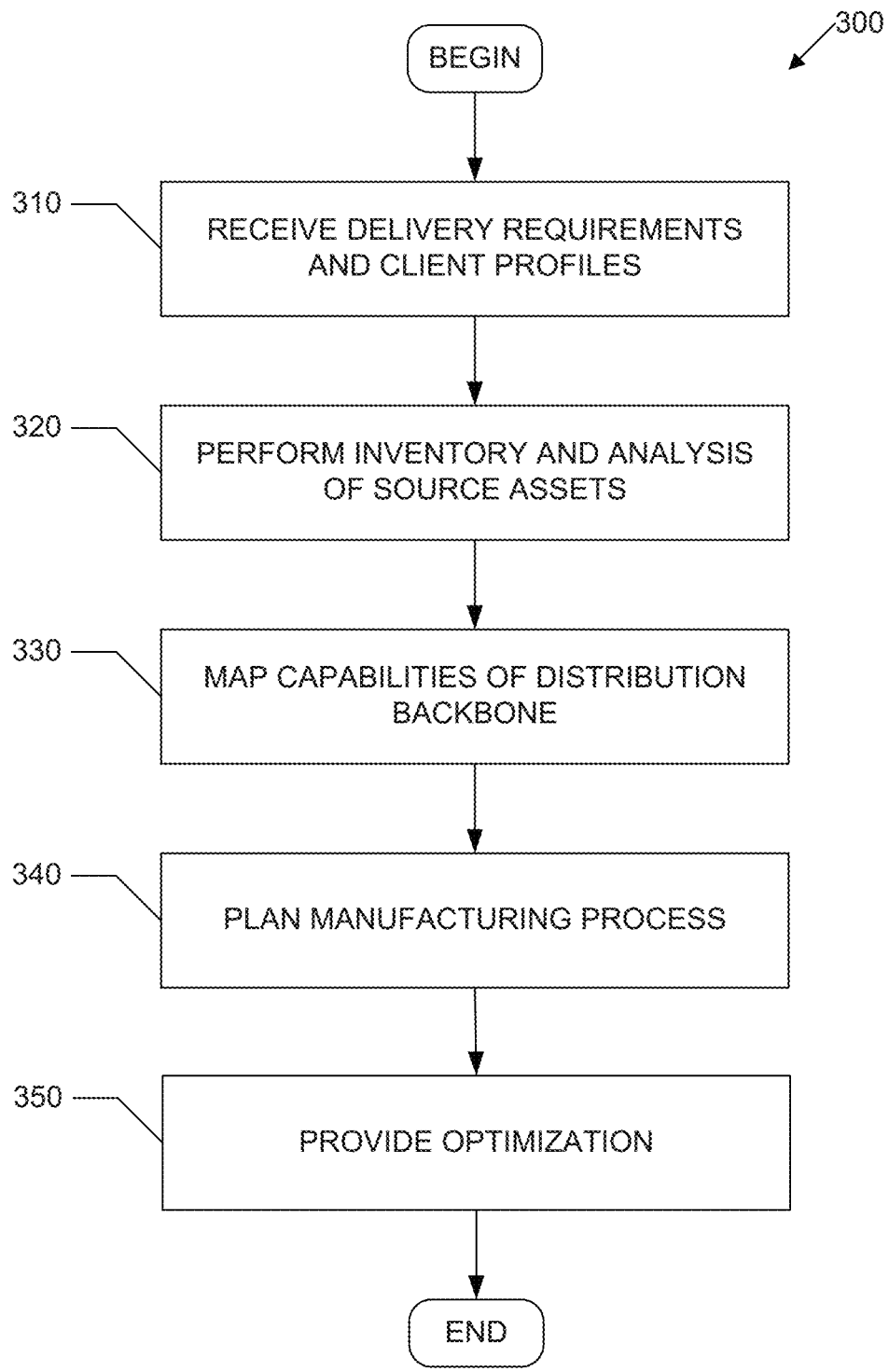
FIG. 3 is a flowchart illustrating a technique for digital distribution of media content using a distribution backbone system, in accordance with one implementation of the present invention.

FIG. 3 is a flowchart 300 illustrating a technique for digital distribution of media content using a distribution backbone system, in accordance with one implementation of the present invention. In the illustrated implementation of FIG. 3, the digital distribution technique includes: gathering delivery requirements and client profiles, at box 310; performing inventory and analysis of source assets, at box 320, by iteratively progressing through the set of requirements to create output (see the description of FIG. 6 and FIG. 7 for a specific use case of the materials analysis); performing capability mapping, at box 330 (see the description of FIG. 8 through FIG. 10 for a specific use case of the capability mapping); planning a manufacturing process, at box 340 (see the description of FIG. 11 for a detailed description of the manufacturing planning); and providing optimization, at box 350 (see below for details).

The delivery requirements and client profiles define a specific set of requirements/specifications for content, delivery, and metadata requirements for a client. The client profiles are used to define the requirements of each client for content delivery. One or more client profiles may be set up per client to represent multiple business models for that client, to represent requirements that vary by territory, or for other business/technical reasons. The specifications define key variables and requirements needed to support automated and manual workflows. Since a specification master is maintained, a single specification can be associated with multiple clients. The capability mapping includes a series of rules that allow source assets to be mapped to the client specification. The manufacturing planning determines work items, execution steps, and optimizations. In another implementation, a distribution backbone system identifies needed source assets and creates a manufacturing plan that will deliver content based on client specification.

Figure 4:
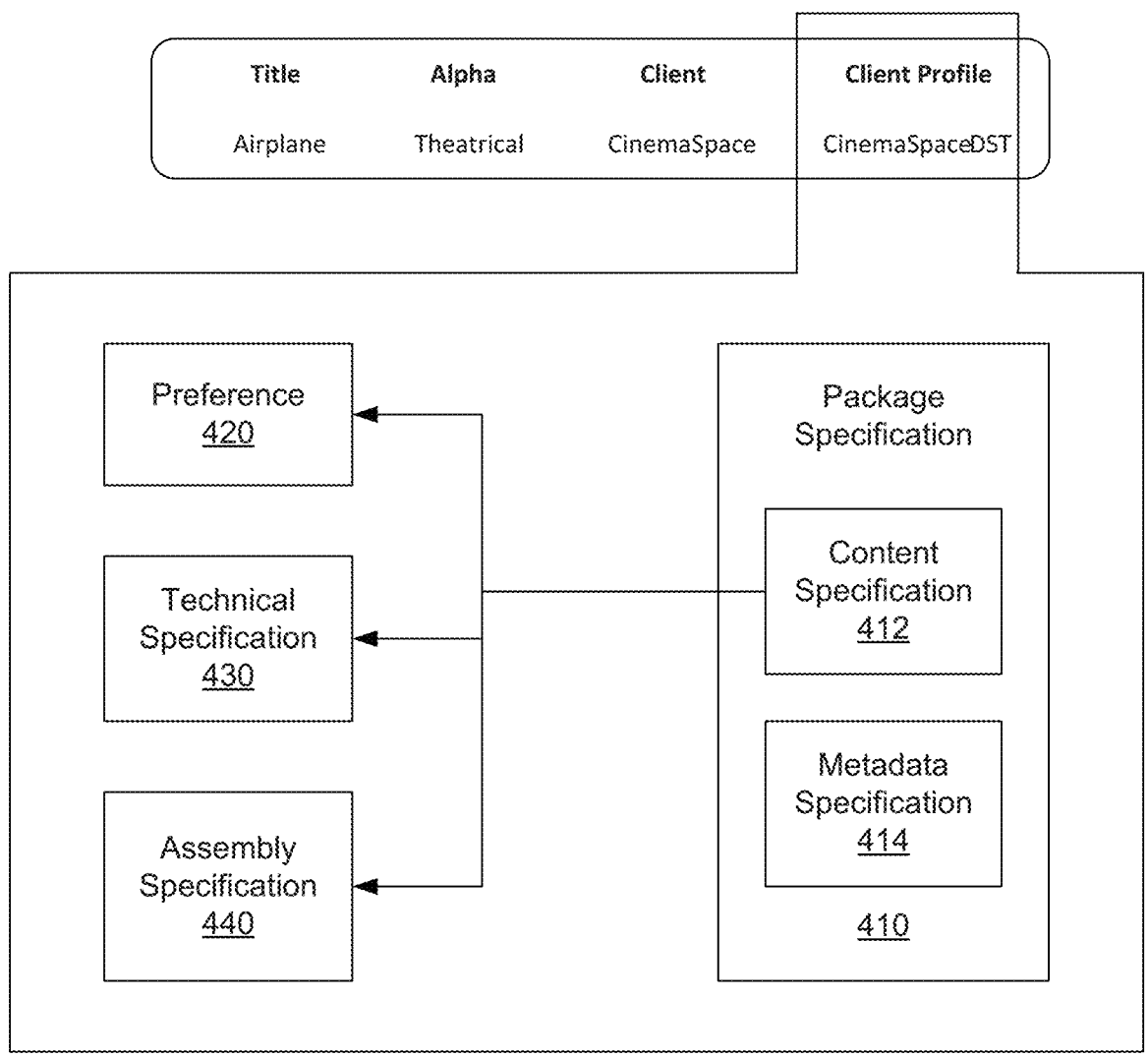
FIG. 4 illustrates a detailed layout of the delivery requirements and client profiles that contribute to manufacturing planning.

FIG. 4 illustrates a detailed layout of the delivery requirements and client profiles that contribute to manufacturing planning. As discussed above, a client profile is a specific set of requirements that define content, delivery and metadata requirements for a client. In one implementation, the client profile includes a package specification 410, preference 420, a technical specification 430, and an assembly specification 440. The package specification 410 defines discrete items that must be delivered to the client to fulfill requests made by the client, and includes a content specification 412 and a metadata specification 414. Preferences 420 are client specific requirements that guide the selection of source assets and limit or relax distribution backbone manufacturing capabilities. The technical specification 430 is non-content-based requirements that define codec, frame rate, picture resolution and other file-based technical parameters. The assembly specification 440 defines any non-linear edit requirements such as logo replacement, pulling/modifying blacks or adding cards. The content specification 412 includes re-usable technical specifications, assembly specifications and preference data.

Figure 5:
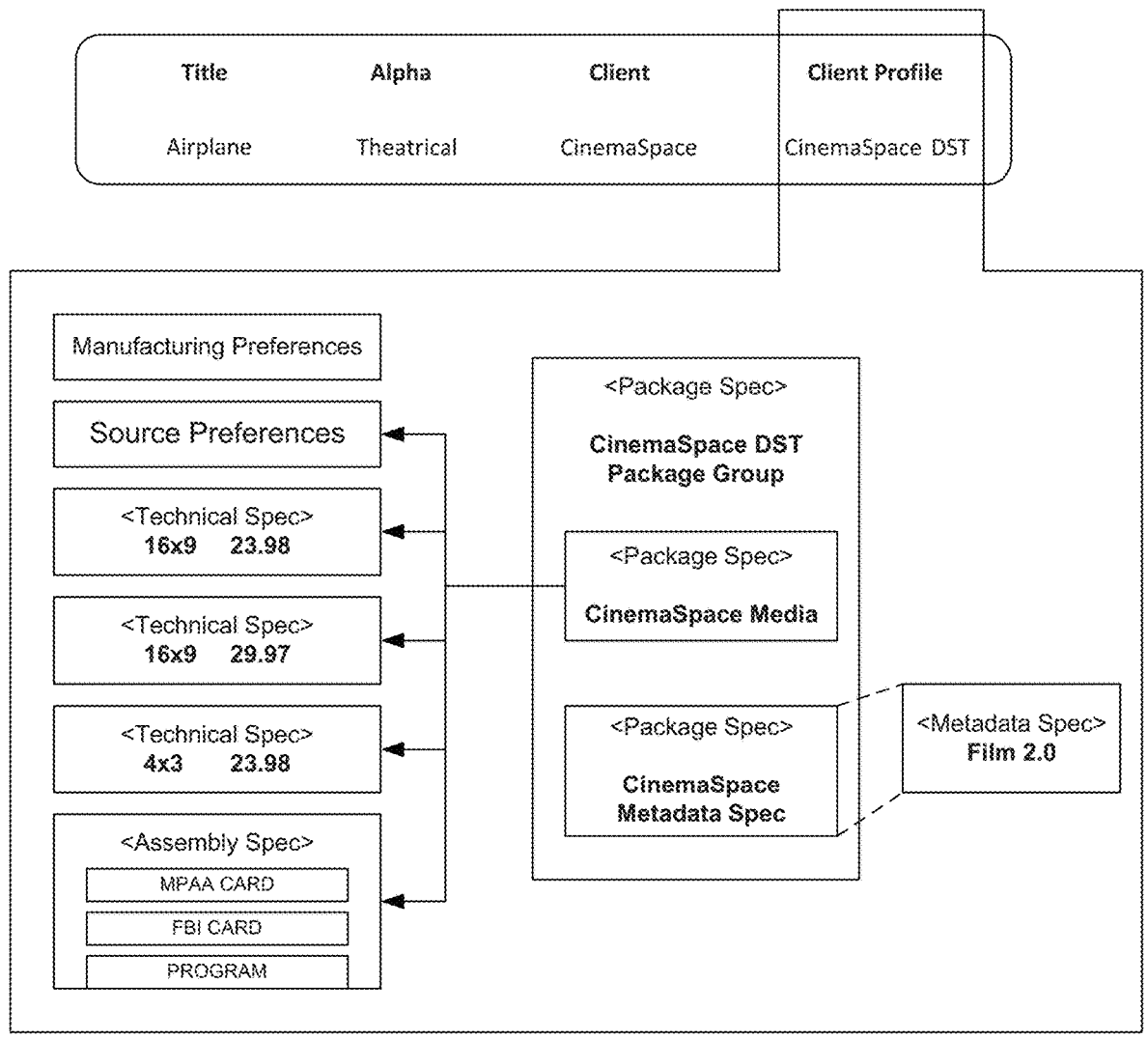
FIG. 5 shows an example use case of a client profile.

In one example use case of the client profile shown in FIG. 5 through FIG. 8, the client, CinemaSpace, and the client profile for Domestic Sell Through (DST) has been identified by the user for the Title "Airplane" and the Alpha "Theatrical." In FIG. 5, the technical specifications are shown to illustrate the client's desire for content with the aspect ratio of 16x9 and frame rate of 23.98. However, additional technical specifications also show that the ability to take different formats based upon the available inventory for the Title/Alpha. The assembly specification provides data directly to the manufacturing plan for use in creating a transcode profile along with the data from the technical specification.

Figure 6:
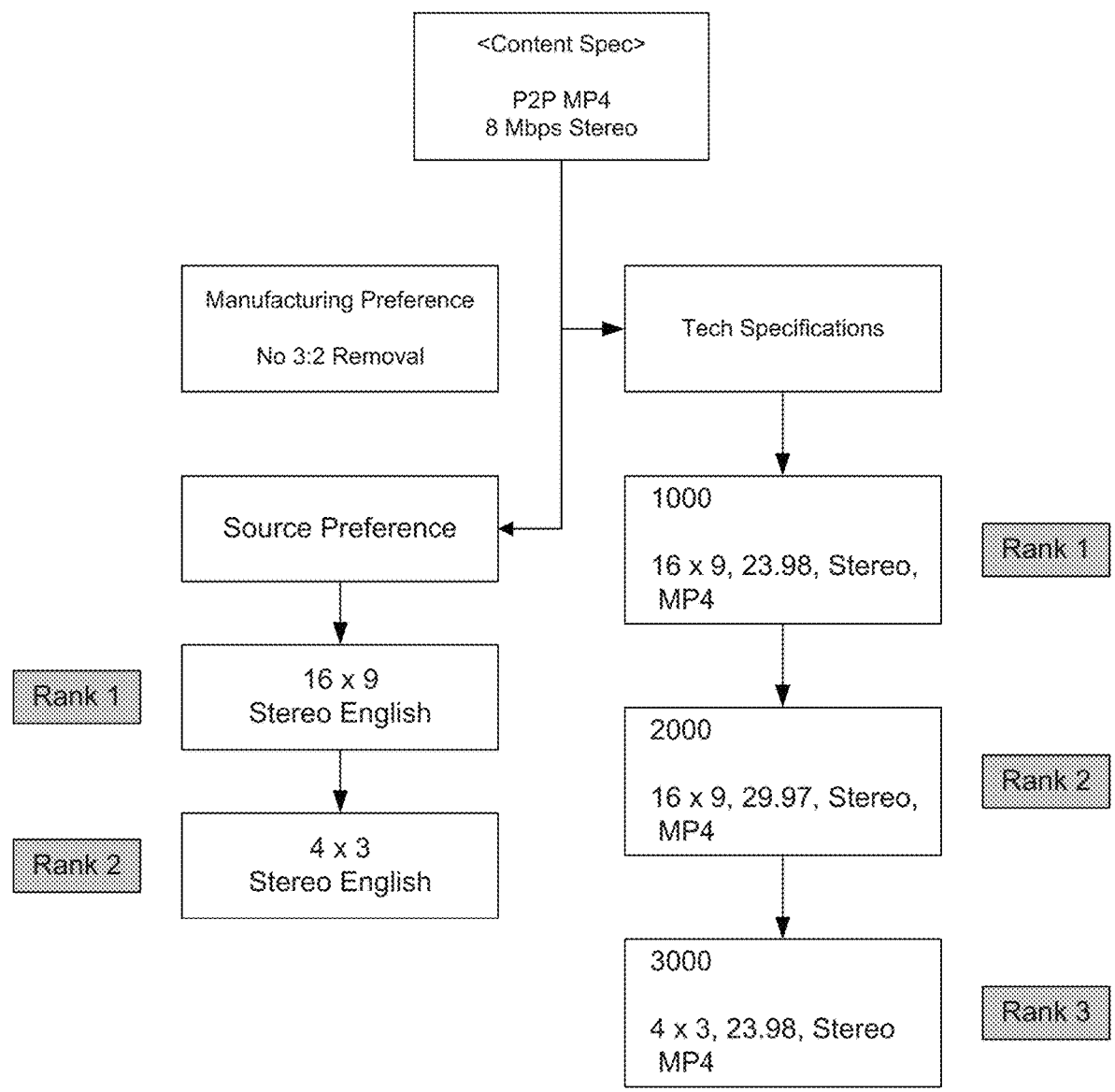
FIG. 6 shows multiple sets of source preferences and technical specifications that express a range of deliverables that a client may accept.

The content specification illustrated in FIG. 6 shows multiple sets of source preferences and technical specifications that express a range of deliverables that a client may accept. These are also ranked in order to express the client's preferences. Source preferences are used to find source assets that may be used. The example data shown in the figure allows for the same content specification to handle titles that are natively 4x3 or 16x9. Title "Airplane" has been chosen as an older catalogue title that may only have a 4x3 video master.

Manufacturing preferences allow onboarding operators to turn on or turn off distribution backbone capabilities based upon client preferences. Thus, in the example shown in FIG. 6, the manufacturing preference indicates no 3:2 removal or pulldown from a film frame rate of 23.98 to a video frame rate of 29.97.

Figure 7:
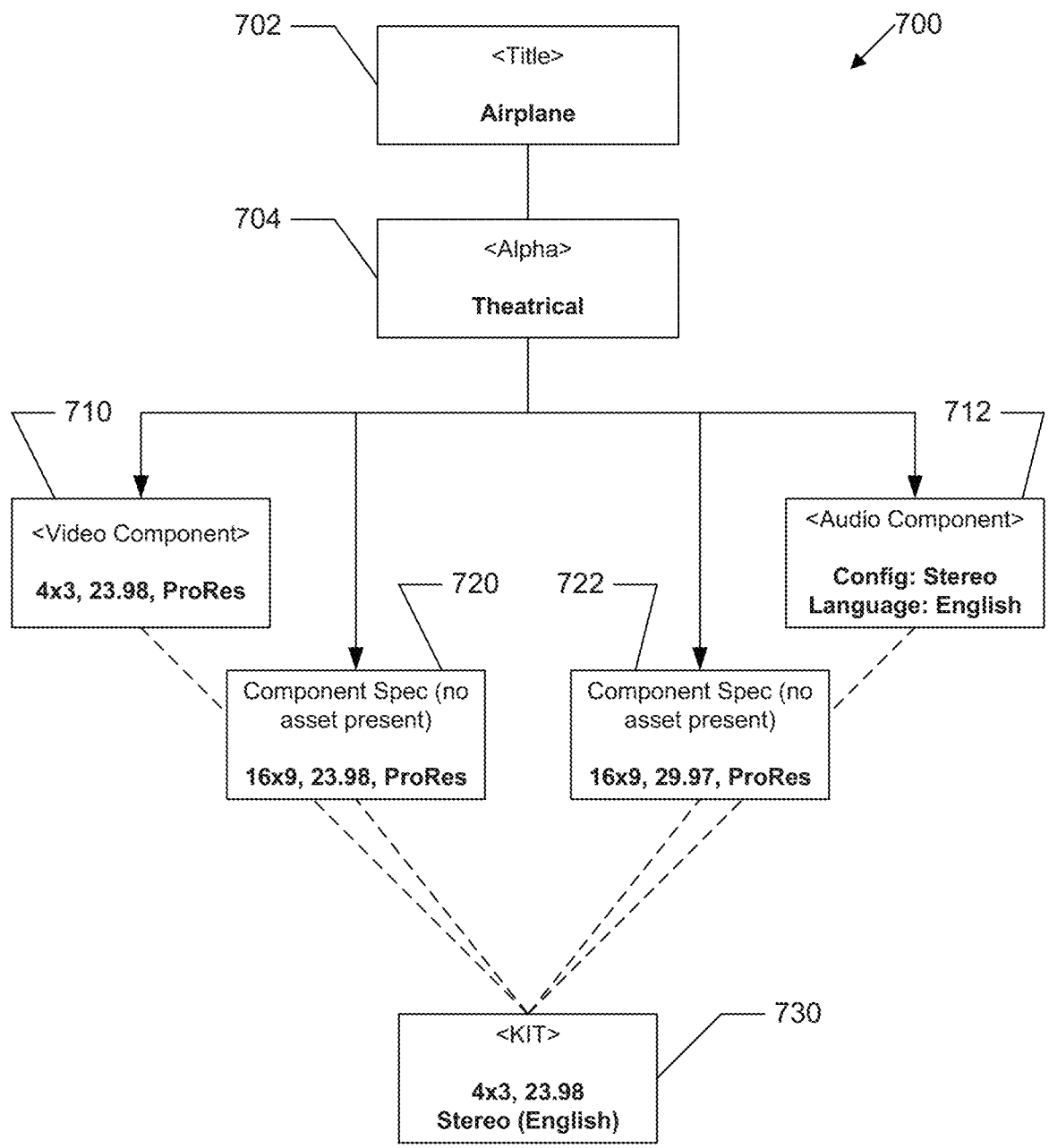
FIG. 7 shows one example of a state of inventory.

FIG. 7 shows one example of a state of inventory 700 for the Title "Airplane" 702 and the Alpha "Theatrical" 704. Boxes 710, 712 represent source assets that are present for the Title/Alpha. Boxes 720, 722 are present in order to illustrate that all source assets are matched to a master specification. When materials analysis is performed, either a source asset or component specification can be found. The finding of the component specification would result in a component requirement including Title, Alpha, and component specification information. A component requirement is a task management tool needed to manage ingest. Kit 730 is a grouping of components (e.g. an audio component and a video component) that is conformed and synched so that components can work together. Components that are determined to work together will be organized to allow workflow master data to point to a kit type. Under the Alpha, the kit will allow specific confirmation of assets that will work together. A kit will generally have one video component and one or more audio components where any audio will work with the video within that kit. The workflow master data supported by client specifications will handle the variability of which audio or supporting material is used from within the kit.

Referring to FIG. 6 in light of FIG. 7, materials analysis is performed to generate a desired output governed by the technical specifications. As discussed above, the materials analysis is an iterative process that progresses through source preferences and technical specifications until assets are found that, based upon system capabilities, can be used to generate the desired output. As shown in FIG. 6, source preferences are sets of criteria that represent non-technical or content preferences for the client.

Referring back to FIG. 6 and FIG. 7, the materials analysis is performed on the example use case. Initially, rank 1 source preferences are used to query the inventory 700. In the example inventory 700 shown in FIG. 7, the system searches for a 16x9 video source and a stereo English audio source. The query also requires that these assets be kitted. However, this query fails because there is no 16x9 video asset. Accordingly, rank 2 source preferences are used next to query the inventory 700. In this case, the system searches for a 4x3 video source and stereo English audio source. The query also requires that these assets be kitted. This time, the query succeeds.

Using the materials analysis performed as described above, a capability mapping is performed next. The capability mapping is a series of rules that allow source asset criteria to be mapped to the technical specification criteria.

Figure 8:
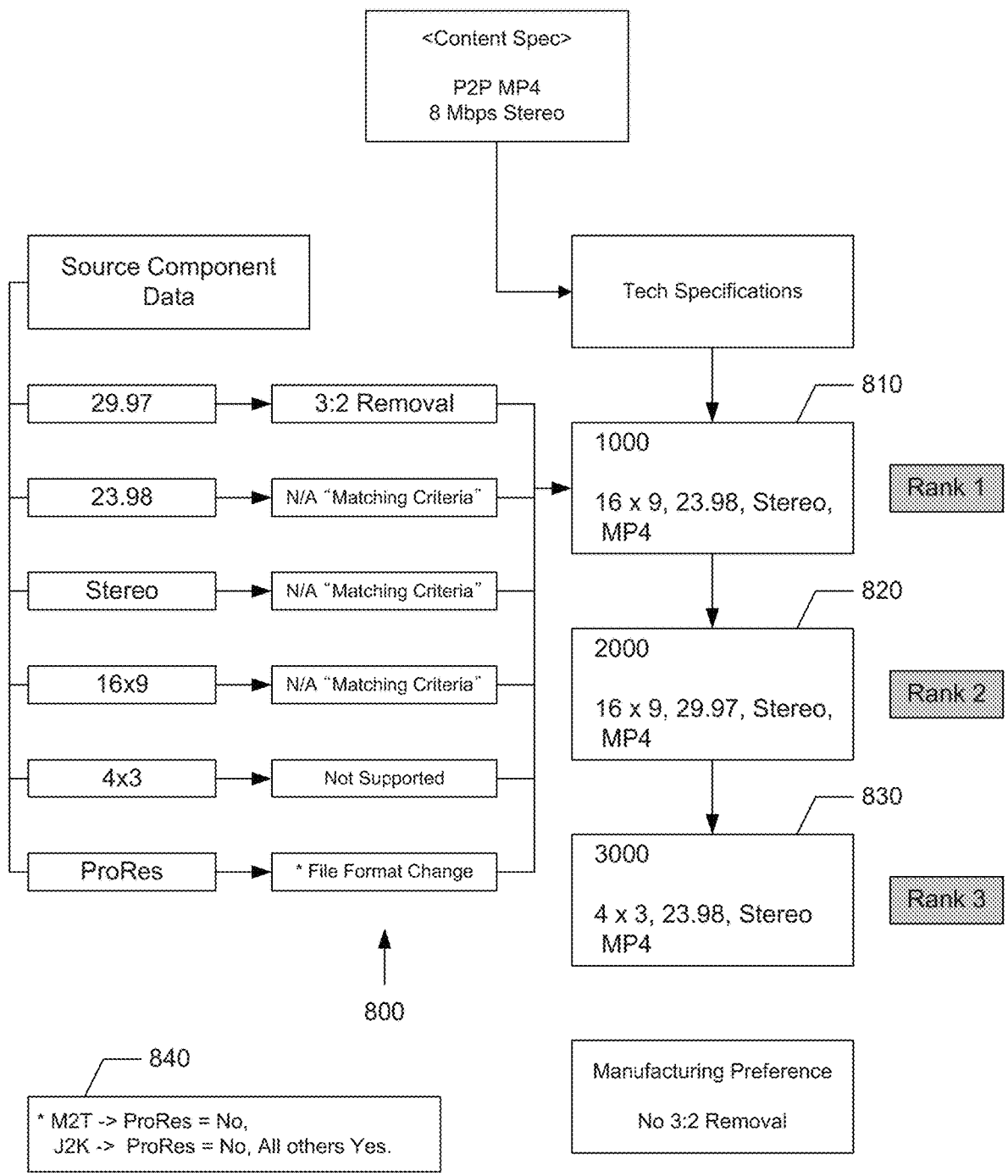
FIG. 8 shows an example use case where data is extracted from source assets when found.

Referring to FIG. 8, when source assets are found, data is extracted from those assets. Data is also extracted from the technical specification. This payload is fed to the rules engine 800. The result is the confirmation that all needed transformations can be accommodated and the identification of the needed transformations. The manufacturing preferences are included in the analysis that may disqualify a system capability based upon client preferences.

In the example capability mapping shown in FIG. 8, data is gathered from the assets identified in the materials analysis query in which a 4×3 video source and stereo English audio source was identified and kitted. Data is also gathered from the rank 1 technical specification 810 and fed into the capability mapping rules engine 800. This iteration fails because we do not have a capability to transform a 4×3 picture master to a 16×9. Note that the rules that govern file format changes can be simplified by creating subordinate rules 840 that disallow certain combinations globally. This alleviates the need to express all possible criteria mapping combinations.

Figure 9:
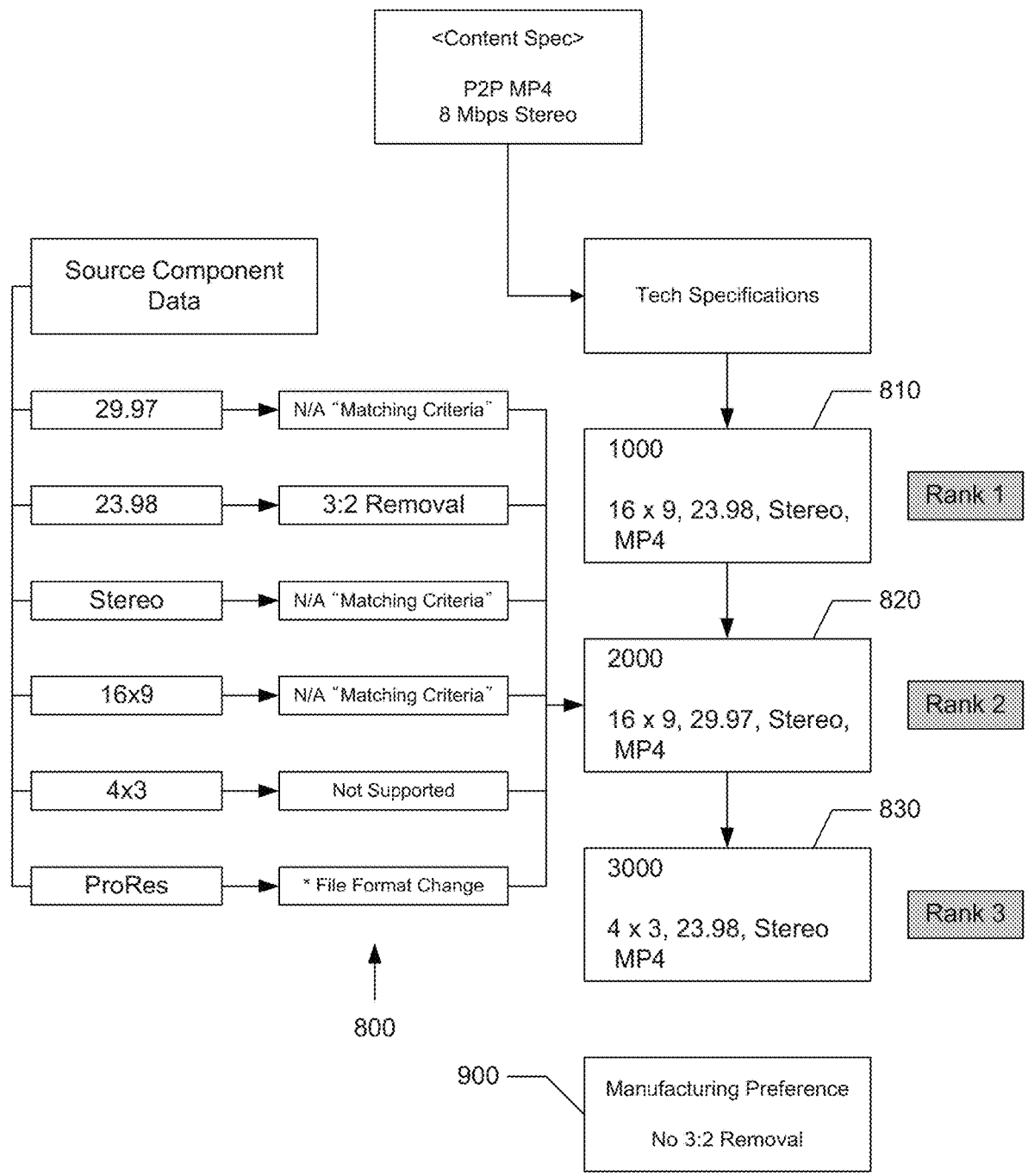
FIG. 9 shows data being gathered from assets identified in a materials analysis query.

Referring now to FIG. 9, data is gathered from the assets identified in the materials analysis query along with data from the rank 2 technical specification 820 and fed into the capability mapping rules engine 800. This iteration still fails for two reasons: (1) a capability to transform a 4×3 picture master to a 16×9 does not exist as before; and (2) the client prefers to receive content that has not been processed through software-based 3:2 removal or pulldown 900, which is otherwise a capability of the distribution backbone system.

Figure 10:
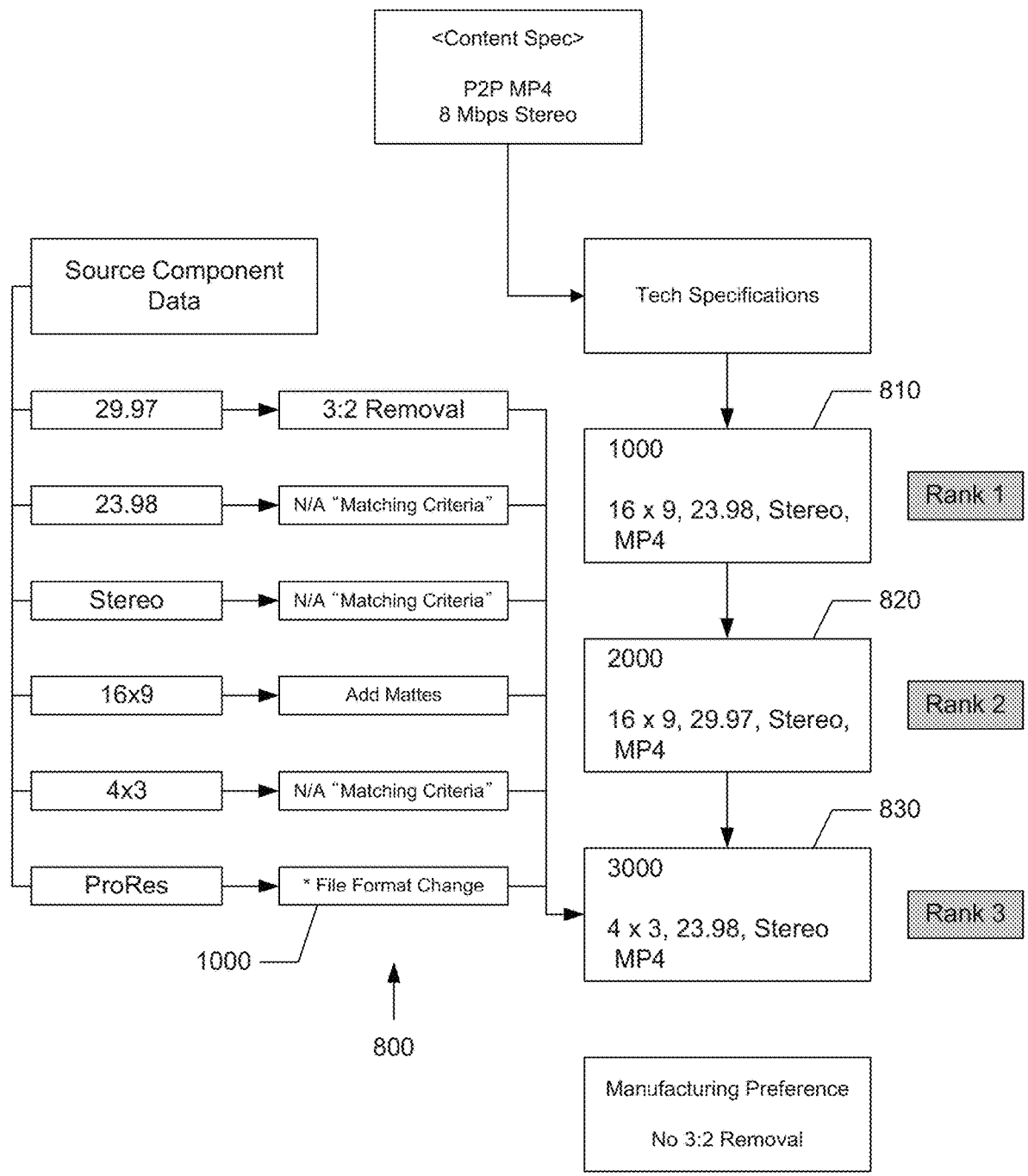
FIG. 10 shows a specific use case of capability mapping.

Referring now to FIG. 10, data is gathered from the assets identified in the materials analysis query along with data from the rank 3 technical specification 830 and fed into the capability mapping rules engine 800. This iteration succeeds with only a transformation 1000 required from the master file codec to the technical specification codec.

Figure 11:
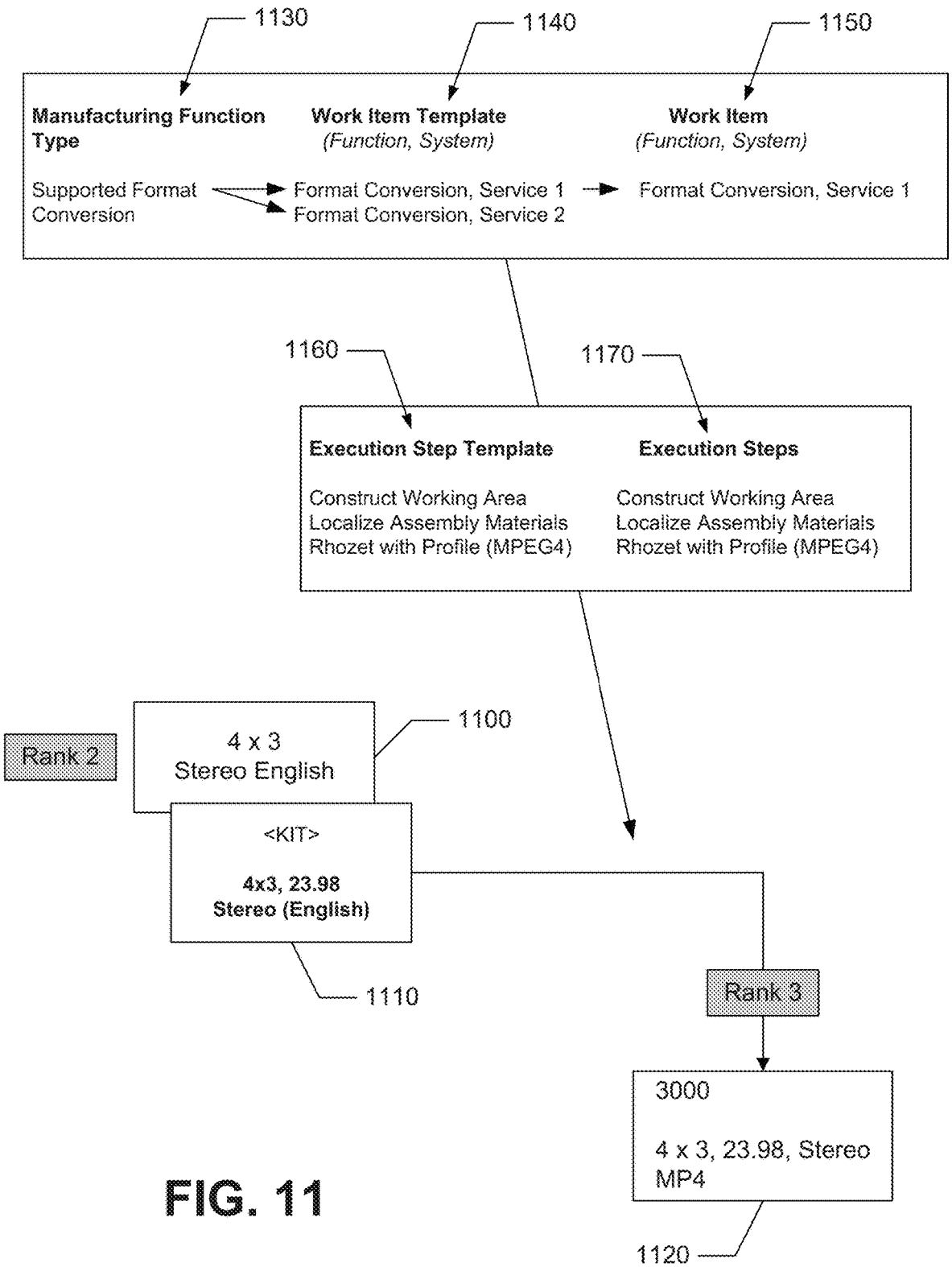
FIG. 11 shows a specific use case of manufacturing planning.

FIG. 11 shows an association of an example source requirement 1100, a kit 1110, and a technical specification 1120 to derive a set of manufacturing functions using system rules and/or logic. Each manufacturing function is an instance of the manufacturing function type that then maps to the list of possible work item templates. A manufacturing function can yield more than one possible work item template. The example of FIG. 11 shows two work item templates, Service 1 and Service 2, for providing a media transcoding solution. Based on system-defined rules, a single appropriate work item is selected, namely Service 1. The work items include information regarding the 'From' parameter (e.g. 16×9), 'To' parameter (4×3), and a system to use (e.g., Service 1). Each work item template is associated with a set of corresponding execution steps within the execution step template. In the example of FIG. 11, following steps are included: Construct working area; Localize assembly materials; and Service 1 with profile (MPEG 4). Therefore, based on the mapping of work item template to execution step template, the desired execution steps are derived.

Once the execution steps are identified, the manufacturing plan can be optimized in various ways. For example, cases with complex multi-step transformations in the manufacturing plan may result in the identification of multiple work item templates (redundancy optimization). These templates may have redundant execution steps such as 'Localizing Assembly Materials'. These redundant steps can be substantially reduced or eliminated in a redundancy optimization. Further, in complex cases, some execution steps may be run in parallel or in a single operation such as 'format transformation' and '16×9 to 4×3 transformation'. These steps can be combined to a single operation during combinational optimization. After optimization, the manufacturing plan is complete. Upon execution, the plan is used to generate the necessary workflow orchestration that will transform the identified source materials into the required client deliverable.

Figure 12A:
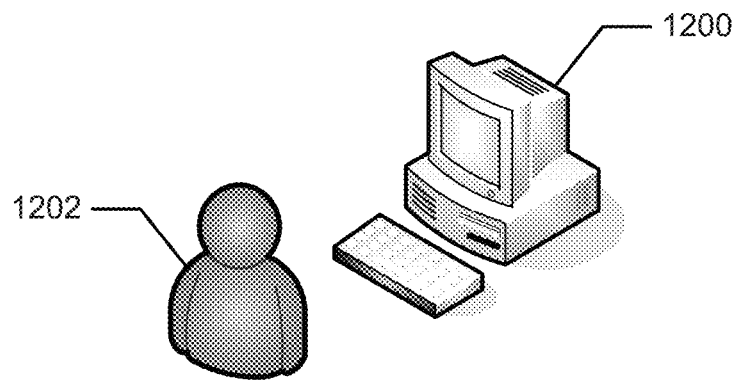
FIG. 12A illustrates a representation of a computer system and a user.

FIG. 12A illustrates a representation of a computer system 1200 and a user 1202. The user 1202 uses the computer system 1200 to perform digital distribution functions. The computer system 1200 stores and executes a digital distribution processing 1290.

Figure 12B:
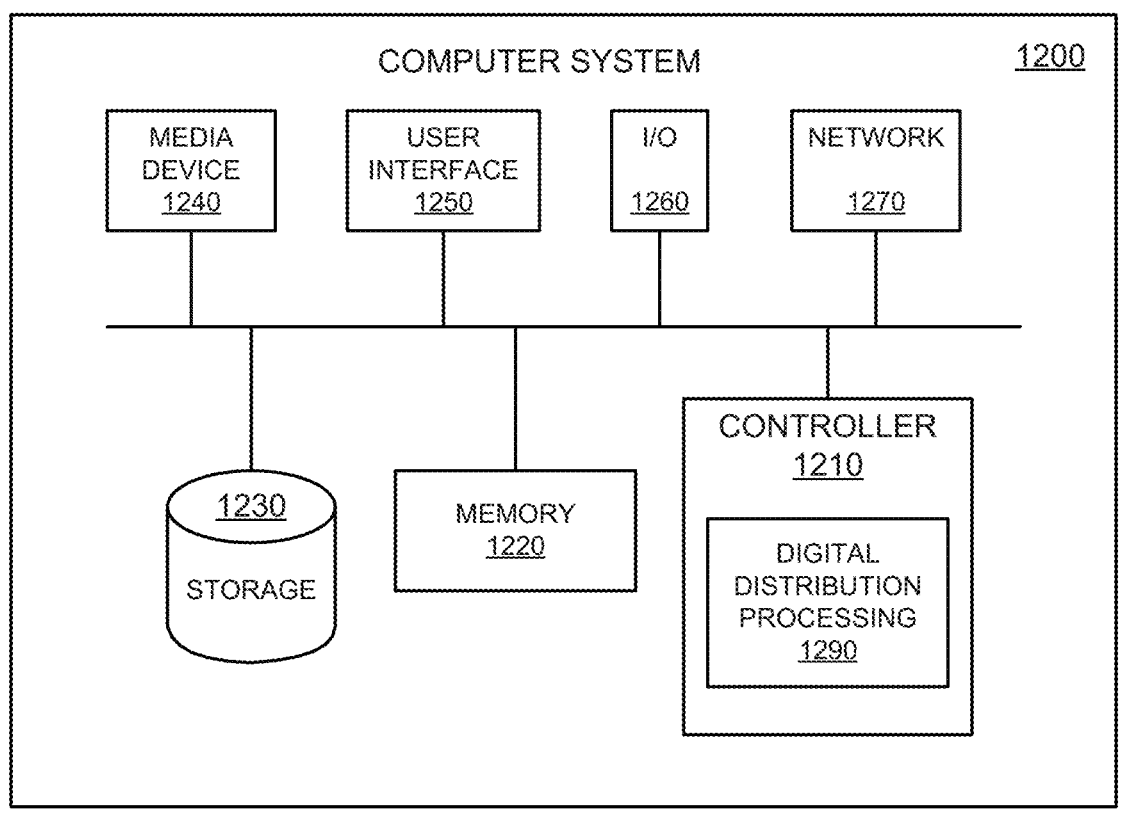
FIG. 12B is a functional block diagram illustrating the computer system hosting a distribution backbone process.

FIG. 12B is a functional block diagram illustrating the computer system 1200 hosting the digital distribution processing 1290. The controller 1210 is a programmable processor and controls the operation of the computer system 1200 and its components. The controller 1210 loads instructions (e.g., in the form of a computer program) from the memory 1220 or an embedded controller memory (not shown) and executes these instructions to control the system. In its execution, the controller 1210 provides the digital distribution processing 1290 as a software processing, such as to provide materials analysis and manufacturing planning. Alternatively, this service can be implemented as separate hardware components in the controller 1210 or the computer system 1200.

Memory 1220 stores data temporarily for use by the other components of the computer system 1200. In one implementation, memory 1220 is implemented as RAM. In one implementation, memory 1220 also includes long-term or permanent memory, such as flash memory and/or ROM.

Storage 1230 stores data temporarily or long term for use by other components of the computer system 1200, such as for storing data used by the digital distribution processing system 1290. In one implementation, storage 1230 is a hard disk drive.

The media device 1240 receives removable media and reads and/or writes data to the inserted media. In one implementation, for example, the media device 1240 is an optical disc drive.

The user interface 1250 includes components for accepting user input from the user of the computer system 1200 and presenting information to the user. In one implementation, the user interface 1250 includes a keyboard, a mouse, audio speakers, and a display. The controller 1210 uses input from the user to adjust the operation of the computer system 1200.

The I/O interface 1260 includes one or more I/O ports to connect to corresponding I/O devices, such as external storage or supplemental devices (e.g., a printer or a PDA). In one implementation, the ports of the I/O interface 1260 include ports such as: USB ports, PCMCIA ports, serial ports, and/or parallel ports. In another implementation, the I/O interface 1260 includes a wireless interface for communication with external devices wirelessly.

The network interface 1270 includes a wired and/or wireless network connection, such as an RJ-45 or "Wi-Fi" interface (including, but not limited to 1202.11) supporting an Ethernet connection.

The computer system 1200 includes additional hardware and software typical of computer systems (e.g., power, cooling, operating system), though these components are not specifically shown in FIG. 8B for simplicity. In other implementations, different configurations of the computer system can be used (e.g., different bus or storage configurations or a multi-processor configuration).

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Accordingly, additional implementations and variations are also within the scope of the invention. Further, it is to be understood that the description and drawings presented herein are representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

APPENDIX 1 FUNDAMENTALS OF DIGITAL SUPPLY CHAIN

The Distribution Backbone (DBB) represents a drive for Sony to extend its presence in an entertainment supply chain service to digital. The importance of this drive prescribes foresight into how the digital supply chain evolves over time and leverages the knowledge and experience. The pursuit of supply chain performance, flexibility and Service 2 through leveraging the supply chain KPIs (continuous improved), supply chain guiding principles, targeting advanced technologies, lifecycle management and the effective segregation of planning and analysis activities from execution efforts. The supply chain expertise within Sony and many partners will be drawn to provide a perspective on how the DBB must advance after its initial release and apply leading operational practices in addition to advanced automated content processing functions Product Lifecycle Management In addition to the intrinsic characteristics, a product will also have a typical Lifecycle it will follow. This Lifecycle can be tracked from the product's inception all the way through its end of life, with optional resuscitations. The lessons from the physical manufacturing of entertainment content on optical media teaches us that there will typically be a hockey stick ramp-up in demand, followed by a decay curve with varying rates of decline. Such knowledge enables enhanced capacity planning.

As a provider of digital supply chain services, Sony will have a vested interest in its customers' Product Lifecycles as a data point to feed into planning activities related to the DBB. This type of awareness is what will allow the DBB to operate at very high levels of efficiency while delivering leading service levels at reasonable cost.

The B2B and digital aspects of the DBB alters the dynamics of Product Lifecycle Management but similar principles can be applied at various levels. For example, the Managed Multi-tiered Storage Environment can benefit from knowing product release windows and preempt movement of files between tiers to minimize retrieval latencies as well as the cost of storage in an online storage tier. Furthermore, Product Families, as explained below, can affect the characteristics of a Product's Lifecycle. Additional Lifecycle information can be derived from attributes such as whether a title is a sequel or prequel as well as general contextual events such as a shift in file format at an industry level.

Product Families

Analysis of product types, processing steps, format types, bit rates and delivery specs requirements can often lead to identification of patterns. Further examination of the patterns will often lead to groupings based on intrinsic characteristics of the product that is being manufactured, in both physical and virtual senses of the term. These groupings provide natural segmentation that can be used to group products into families for which different processes and execution rules can be applied.

The DBB must flexible and support customization of orchestration workflows according to these Product Families. As with most segmentation efforts, the alignment of workflows to Product Families reduces the overall number of unique cases and exceptions. The goal is to streamline execution pipelines and make them flexible. This in turn enables focus on core processes that drive value within the supply chain.

As an example, analysis of operational data is likely to reveal commonalities between two major groupings of products: features versus episodic. Each type of product may have ideal flows that help its Workability (defined below). Similarly, acquired content may benefit from alternate processes or orchestration workflows compared to produced content.

Workability and Milestone Management

Building a digital supply chain involves the coordination of many process steps similar to traditional supply chains. The activities are planned in advance of execution with an emphasis on laying the groundwork to allow streamlined execution once the plan is put into effect. Defining Milestones within these plans allows for discrete units that can be more easily managed and tracked. Potential delays can be analyzed and tracked to root causes. Milestone Management therefore improves Workability, avoiding setbacks or exceptions during execution.

Having Workability and Milestone Management support provided by the DBB will be a core pillar in allowing Sony to become a center of excellence by truly becoming a partner with its digital supply chain customers. The DBB can leverage Templates providing default process steps planned to a timeline adjusted by input parameters. Target dates are established and can be tracked against actuals and provide an opportunity for collaboration to meet unified objectives with mutual understanding of an adjustment's effects.

The DBB will have dependencies on external touch points that may affect Workability such as obtaining Masters from the Mastering group. The Milestone of receiving the Master can be captured in a Template with parameters related to Product Families such as varying mastering lead times between theatrical and episodic titles. Breaking down the overall work into Milestones may help identify the root cause of requisitions not being completed on time. Analysis of these requisitions may show patterns associating the delays to a particular Product Family (e.g. Masters for acquired content may often encounter delays due to the uncontrolled or unknown quality of source materials coming through via acquisitions) and help address Workability by focusing efforts on the improvement of processes or systems for that particular segment that can be tracked down to a particular Product Family.

Run Strategy and Optimization

With these vital foundations in place, further optimizations can be implemented. The foundational elements provide data points that can be processed through sophisticated analytics leading to additional identification of patterns as well as people driven continuous improvement. These patterns and process improvements can then be used to define rule sets at varying levels that are fed in as Run Strategies.

Flexibility is a key tenet the DBB must adhere to and it will ultimately allow the effective use of the Run Strategies defined above. At the system level, the ability to apply rule sets that optimize the supply chain must be a core capability of the system and one that can ideally be leveraged across all supply chain systems, even outside of the DBB. This extensibility supporting enhanced supply chain practices should not be limited to the DBB but made available for integration throughout the Entertainment Supply Chain Center of Excellence.

Sony expects to pool existing knowledge to incorporate Run Strategies and Optimizations wherever possible for the initial rollout of the DBB. This knowledge will come from data points of the existing systems and processes and will be incorporated for the to-be solution. An immediate impact will be seen on how the migration Run Strategy will be defined to ensure that the titles and clients that drive the highest benefit will be imported and on-boarded into the DBB. Initially, the resulting rules may be applied in a semi-automated procedural manner, but Sony's long term goal is to truly apply the Run Strategies and Optimizations in a more systematic way with automation included wherever it is beneficial.

APPENDIX 2 RELATIONSHIP BETWEEN PARTNERS AND CLIENTS

1. Overview

The Distribution Backbone (DBB) requires the maintenance of certain types of data in order to accomplish its vision of providing Partners with a capability of servicing their content distribution needs. Partners, Clients, Client Profiles, Specifications and Configurations are several key entities for which data will have to be stored and managed within the DBB.

2. Description

Figure 13:
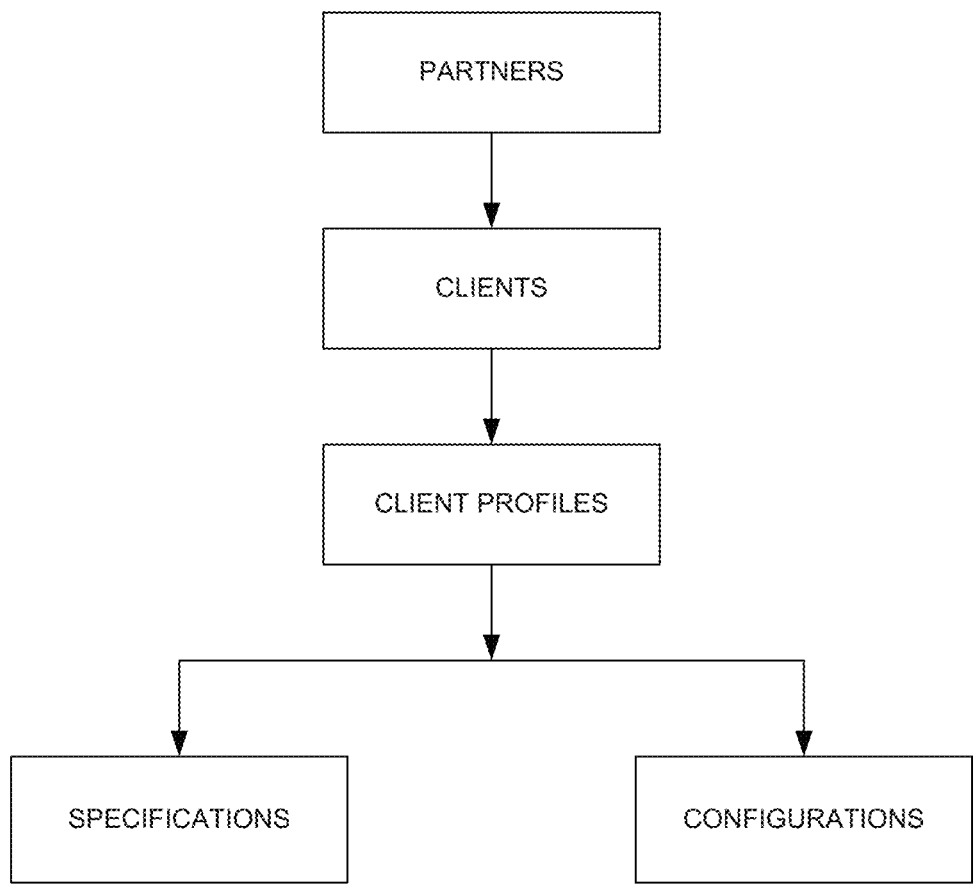
FIG. 13 is a sample entity relationship diagram depicting how Partners and Clients are expected to relate with Client Profiles, Specifications and Configurations.

FIG. 13 is a sample entity relationship diagram depicting how Partners and Clients are expected to relate with Client Profiles, Specifications and Configurations. The purpose of this diagram is not meant to define the final design but meant to help describe the types of relationships expected to satisfy state process maps.

Partners are content owners and customers of the DBB. Partners will sponsor users and grant them access to the DBB in order to generate requests and visibility to workflow status. Each Partner will have the ability to distribute content to one or multiple clients.

Clients are companies under contract with Partners to receive content. A Client record defines information needed to define the business entity. While contact information may exist at this level, Contacts may also be associated with Client Profiles as described below.

A single client may do business with multiple partners e.g. Amazon with Sony and Paramount. A separate client record will be maintained for each Partner. However, all client records representing the same company under multiple partners must be associated to provide a view of that Client across all Partners. Sample Clients include Apple and Amazon (DDI), Comcast and AXN (Broadcast). Clients will be added to the DBB on an as needed basis in order to fulfill Partner requests for content distribution.

Client Profiles are used to define the requirements of each client for content delivery. One or more Client Profiles may be set up per client to represent multiple business models for that client, e.g. DST, DDI, VOD or as requirements vary by territory or other business/technical reasons. As stated above, contact information may be associated to a Client Profile if multiple contacts exist for the client. Client Profiles will be created by DBB Administrators.

Specifications define key variables and requirements needed to support automated and manual workflows. Specification information may be common across many clients. A specification master will be maintained to allow the association of a single specification to multiple clients. Modification of a Specification must be allowed at the Client level or at the master level. Modification at the Client level may result in a new record within the specification master. Modification at the master level would allow changes to be propagated to all clients associated to that spec. Validations should be in place to ensure that duplicate specifications are not created.

While the functional requirement of the specification is to support content processing and distribution, a human readable abstraction of specification data will be available to Partner for review and communication purposes.

Variables—In conjunction with a Specification, some information may be defined as unique to each profile. This information within the specification can be defined as input variables upon association to a Client Profile. For example, a delivery specification may define a means of delivery, but variables specific to a Client may include aspect ratio preferences.

Configurations—Configurations are sets of information created individually for each client profile. While Specifications represent reusable information sets that may be associated to Client Profiles, Configurations can be specific and unique to a Client Profile. In some cases, "standard configurations" may be reused across multiple client profiles.

Specification Types—The DBB stores and manages multiple types of specifications in support of content transformation and delivery. Specification types include but are not limited to:

a. Product Specification—Defines the technical metadata required to create the final distributed product, which could include Video, Audio, Images, Captions, Subtitles etc. The Specification leverages and shares with DBB services like transcoding in order to produce a final product with matching technical specifications. The Specification includes bit-rate, frame rate, file format, etc.

b. Metadata Specification—Defines the information required to generate a metadata deliverable/file. Leveraging information available within the metadata specification, the system determines the end-state metadata file format (e.g. XML, Excel, CSV, etc.) as well as the specific metadata fields and values to be included for a specific Title/Alpha. It is important to note that the metadata specification acts as a validation to enforce an appropriate end structure of metadata. Certain fields may be required and enforce data to be provided in a certain format (YYYYMM-DD). Other fields may be defined to accept repeating values and controlled vocabulary. The metadata specification provides mapping and transformation rules needed to interpret the DBB enterprise canonical metadata repository. Fields defined within the specification will be referenced using an enterprise canonical DBB metadata ID.

c. Other Specifications—Additional required Specifications may be identified during design/implementation.

Configuration Types—The DBB stores and manages multiple types of configurations in support of content processing and delivery. Specification types include but are not limited to:

a. Assembly Configuration—Specific to content processing, there is a separation between the specification for the Product essence and the Configuration for assembly. Assembly Configuration defines the assembly and order of appearance of content and additions such as logos, ratings, warnings commercial blacks etc. This information is separated from the Specification for a Product due to the greater variability of these configurations based upon client needs. Multiple clients may take the same file specification and bit rate, but require different Assembly Configurations. Examples of Assembly Configuration items are Logos, ratings, bugs, and overlays, warning cards insertion, bars tones and commercial blacks.

b. Package Configuration—Defines the information required to generate a package. Package related information may include packaging manifest location/format, packaging contents naming convention, contents directory path, output package directory path and package wrapper type definition (e.g. MXF, ZIP, directory structure or loose files).

c. Delivery Configuration—Defines the information required to deliver a package. Though the intent is digital delivery (e.g. Aspera, SmartJog, FTP), the delivery Configuration is able to handle physical output. An example of outputting a package to hard drive and having it shipped to a physical address. In this example, the delivery Configuration method is "hard drive".

Assuming an FTP Delivery Configuration is being generated, the Selection of a method such as FTP is part of the Configuration. Additional inputs such as IP address, Username, Password and Port are entered to fully define the delivery method. This information is stored as set of data associated to the Client Profile.

A second configuration for Hard Drive or Aspera could be added for the Client Profile. The data required for each configuration is specific to the delivery method chosen.

Client/Profile Status—In order to control whether the DBB may service a Client or Client Profile, statuses and associated rules must be configurable.

Profile/Specification association—Within the Client profile, multiple specs may be assigned within each category noted above. One specification of each kind is established as a default, but the user may override the default and select a different available specification that has been associated to the Client profile.

In one example, the default delivery specification for a client profile is FTP, but due to the large size of a particular Request, the requestor may choose Hard Drive as an alternate delivery specification.

Title Type—Multiple Product Specifications may exist as described above. During association of a Product Specification to a Client Profile there is a Variable that allows definition of the Title Type. This allows a Specification to be assigned for a specific type of Product, e.g., Feature, Episodic or Trailer. Each Title selected for processing has either a default Title Type in the case of Feature or Episodic or allows the selection of the Title Type in the case of a Trailer only request. This Variable supports the need to process different types of titles with different Product Specifications.

3. User Interface

From a user interface perspective, managing Partners, Clients and Client Profiles is expected to be handled via a user interface. These features will mostly be managed by internal DBB business analysts. Specifications however, are technical in nature and would most likely be managed by a DBB technical resource and could be managed within XML if required.

4. Services

Services are not exposed by the DBB other than through the UI for managing Partners, Clients, Client Profiles, Specifications and Configurations. The management of this data will only be handled from within the DBB.

5. Interfaced Systems

Partners, Clients, Client Profiles, Specifications or Configurations will not leverage interfaces to external systems.

6. Multi-Tenant

The concepts discussed above regarding Partner/Client relationships inherently define multi-tenant requirements for the DBB. Administrative programs must allow the creation of the hierarchical relationships described above.

APPENDIX 3 REQUEST MANAGEMENT

1. Overview

The DBB requires a user interface to enable entry of requests for various forms of content processing. Request Management provides functionality needed to identify clients and their needed deliverables. This user interface is the primary point of interaction between the business users responsible for fulfillment and the DBB. All clarifying information needed by the DBB, whether technical or business related, is managed through this interface. All status requirements of the business unit is addressed through this interface. To the extent feasible it is intended that this interface utilize the data structures later described to create intelligence that allows the user to enter more general information and be guided or assisted by the system into the level of specificity needed by DBB to fulfill the requirement.

Request Management is a suite of user interfaces (UIs) that allows access for authorized users to UIs described here and to more granular levels of DBB workflow details as described below.

2. Description

Figure 14:
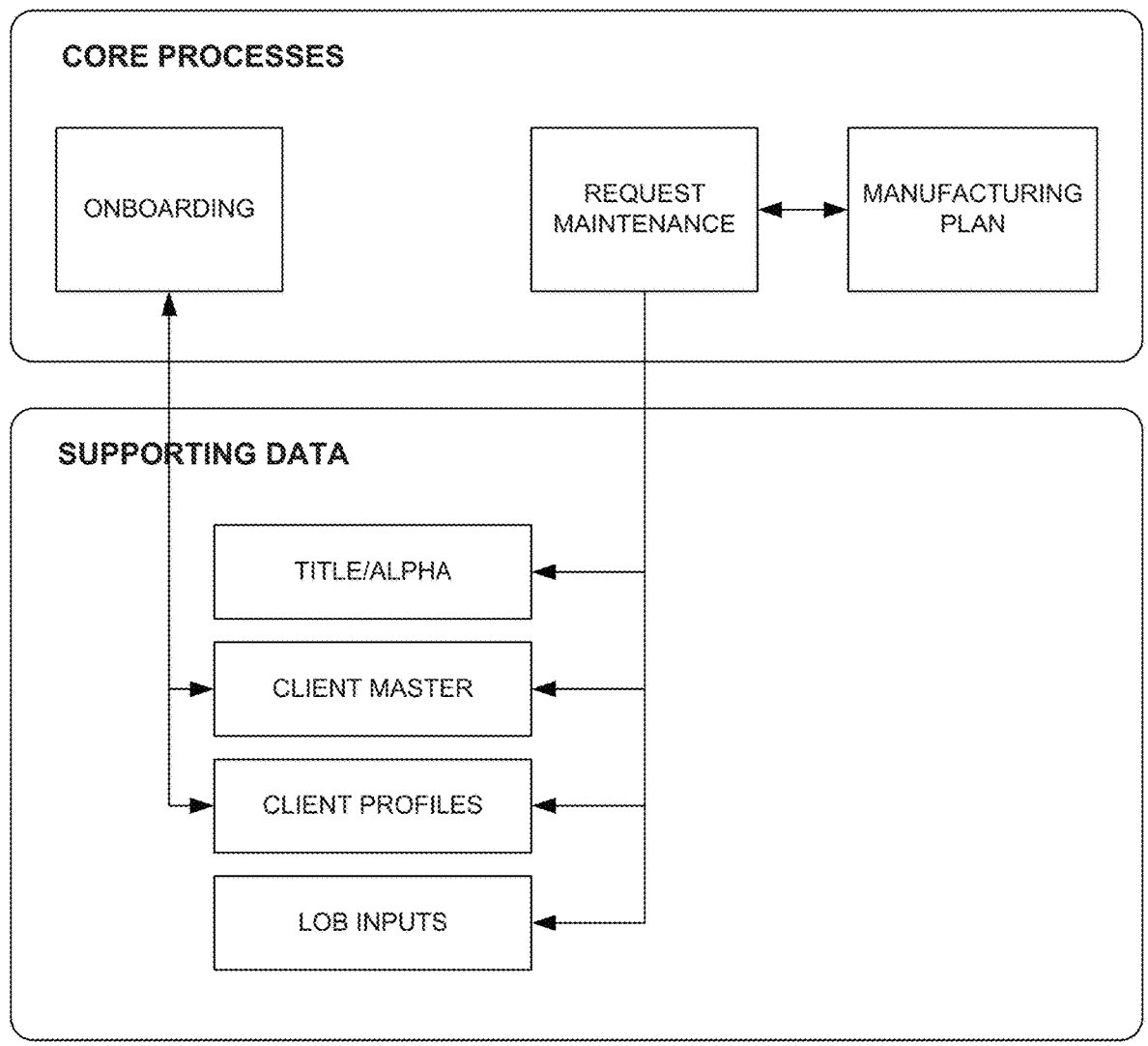
FIG. 14 displays the primary inputs to the Request Maintenance module.

FIG. 14 displays the primary inputs to the Request Maintenance module.

LOB Inputs—The LOB or "Line of Business" Inputs represent the Originator, e.g., Sony Sales Divisions. These divisions license content to various customers and require fulfillment from Requestors, e.g., Worldwide Product Fulfillment (WPF). Requestors will use the DBB to create and deliver this content. At a high level, the LOB provides deal terms such as license window, air date, license type and other meaningful information. This information will be included in the Request submitted by the Requestors. Further, the LOB provides the primary inputs for the request, Titles and Clients. In general terms and as applicable to Partners, this is business related information that could be required to be included in Package Metadata or to support Billing Transactions.

Clients—The Originator will specify one or more clients to be processed for a given request. DBB Requestors will determine the appropriate client profiles within a request in cases where a single client has multiple profiles. Client/Client Profiles represent content licensors that have contracted with the LOB for specific Titles. It is assumed prior to the creation of a request that clients have been onboarded and all appropriate Profiles and Specifications have been created. Specification information must be made available in a view only format to the Requestor in order to facilitate Profile selection.

Title/Alpha—The essential directive within a Request is to deliver one or more specified titles to one or more Clients. As described in Appendix 4 Inventory Organization, the Alpha represents a content level variation within the title that may be specific to a given territory or market. For example, for the title "Over the Hedge", a scene where one character hits another character with a golf club is changed for theatrical distribution in Japan. Based upon this requirement, all post theatrical distribution to any Japanese customer uses the same edited version or Alpha.

Title/Alpha Selection—It is assumed that the selection of a specific Alpha in cases where a Title has more than one will be performed by the Requestor. However, this choice can be assisted and/or automated based upon the business rules that rely upon the metadata present at the client profile level and at the alpha level.

Specification/Configuration Selection—Content specifications and configurations will be defined and associated with Client Profiles. There may be multiple specifications and configurations associated to a client profile based upon the Title Type to be delivered. As stated in Appendix 2 Partner-Client Relationships, multiple specifications and configurations may be present including a default. The Requestor may select alternate approved specifications within the Request. Information is available to assist/automate the selection of the specification. For example, Multiple Product Specifications are defined for a client, one for Episodic content and one for Feature content. Within the Client Profile maintenance the business rules for selection of the appropriate spec are defined. This could be done with a "Title Type" value for purposes of this example. This same metadata would be associated to the Title selected on the request, facilitating the identification of the essence specification as required by the Title/Client combination.

Multiple Titles/Multiple Clients Request—Requests can be generated in several different ways. The following are some examples: One Title and one Client; One Title and multiple Clients; One Client and multiple Titles; and Multiple Titles and multiple Clients.

The most complicated scenario is the Multi-Title/Multi-Client. To minimize the complexity of this scenario, the desire is to ensure that when multiple Titles are selected, all selected Titles will be fulfilled to each selected Client. The Requestor will not have the ability to configure which Titles will be associated with which Client. In cases where not all Titles are fulfilled for all Clients, multiple Requests will have to be made.

3. User Interface

The user interface application allows users to create, update, cancel and obtain status for various requests. A search and summary display is assumed as well. In cases where the definition of Client/Profile and Title selection require additional assisted/automated selections, these are handled in a wizard format, leading the user through the decision-making process to the depth necessary to complete the order. This depth should reach to the level of specific Component search and selection as well as manual specification selection. The depth of determination allowed to a user should be configurable. Certain levels of selection such as for specific source Components may be determined to be under the responsibilities of operational personnel.

4. Services

The Request module services are assumed to be exposed within the DBB only and do not require formal APIs to allow tie in with other systems. The architecture, however, should not preclude the flow of request data directly from any Partner.

5. Interfaced Systems

The Request module will have functional relationships with the Customer Master, Title Master, Workflow Master and Task Management. These data sets will be within the backbone and not interfaced for purposes of application architecture. The only exception would be the GPMS Title interface. Title/Alpha information will be interfaced and will be stored internal to the backbone to the extent necessary to support distribution. The Request module may require a direct query to GPMS in order to view additional title information not stored in the DBB.

6. Multi-Tenant

The DBB has multi-tenant capabilities as described in Appendix 2 Partner-Client Relationships. Multiple "Partners" will require access to the Request UI. Login and security privileges must be maintained independently for each Partner user group. Data must be fully segregated for all levels of information described herein.

APPENDIX 4 INVENTORY MANAGEMENT

1. Overview

In addition to the use of automated content processing technologies, key goals of the DBB include the extension of rule-based automation to all aspects of fulfillment workflow. Current filmed entertainment inventory metadata models do not possess the rigorous organization required to support automation in the areas of source asset identification. Asset receipt and storage processes and the metadata typically recorded are subject to significant error rates. The resulting manual labor required to identify the correct source assets at production run time has become a significant bottleneck in current digital fulfillment. The implementation of more stringent and rigorous metadata controls can enable the automation of asset selection and greatly reduce manual intervention and overall throughput.

Two key concepts have been identified that require more structure in order to support unambiguous inventory. The concept of Version has been renamed in Sony nomenclature to "Alpha". This concept represents the variation of content that may exist within the inventory for a given title. Adding structure to this concept will allow more accurate interrogation of inventory, creating compatible "Kits" of inventory within a given title. Within an Alpha organization, Component based inventory leverages traditional manufacturing disciplines by facilitating the linking of source assets to the workflows which they support. These concepts support automated media content processing in the same way that a bill of materials supports the automation of traditional manufacturing.

The scope of inventory visibility will encompass digital assets within the DBB DAM solution and will also extend to external physical and digital components within the Partner's Physical Asset Management solution. The extent to which the organizing principles described herein are implemented into physical assets must be flexible so that business needs for cost and lead time analysis may be met.

2. Description

Figure 15:
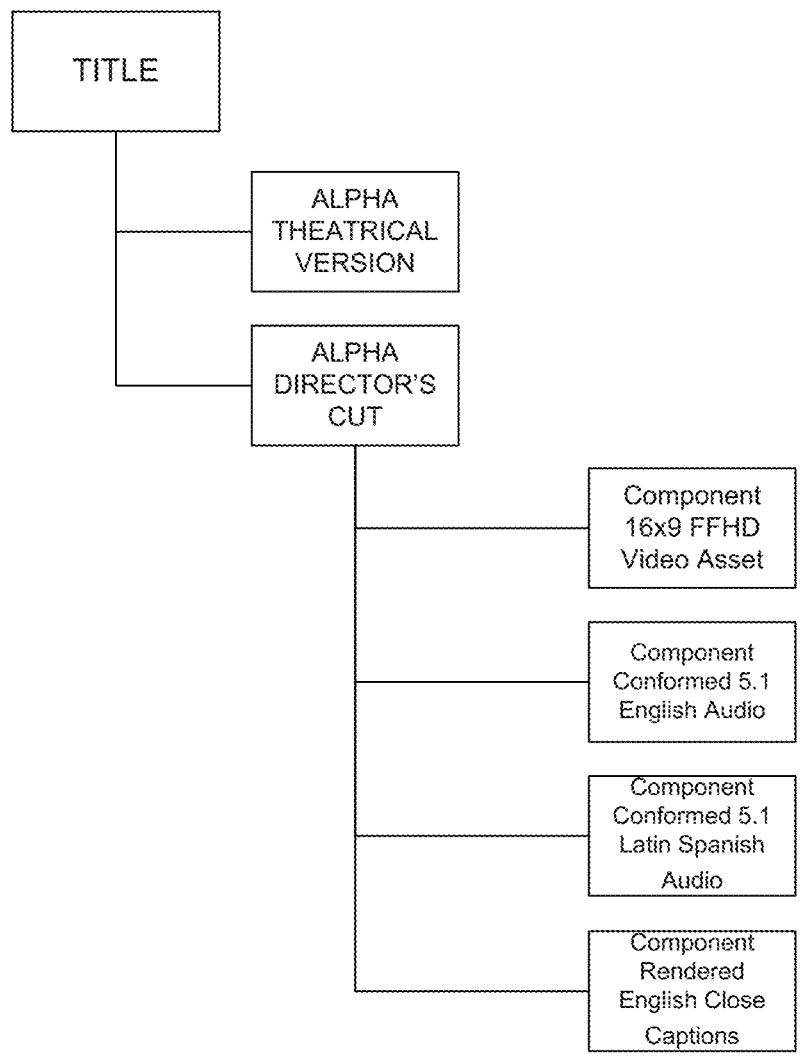
FIG. 15 displays a sample hierarchy that exists between a title that has two Alphas (the Director's Cut and the Theatrical Release) and the family of components that would be identified to service the Director's Cut Alpha.

FIG. 15 displays a sample hierarchy that exists between a title that has two Alphas (the Director's Cut and the Theatrical Release) and the family of components that would be identified to service the Director's Cut Alpha.

Alpha—The alpha concept facilitates two key requirements within the DBB; identification of the client needs for a title with version based video or audio content variation and as an organizing principle of asset inventory needed to service those variations.

An Alpha typically describes differing versions of a title. These differences are typically related to where and how the Title/Alpha may be distributed. An Alpha may be created based upon Standards and Practices edits required to display the title in a particular territory, market or media. As each customer will possess market, media and territorial definition within their profile, the association of the same data to the alpha may assist in the automated identification of appropriate version for the selected client. The association of various concepts of distribution rules to each Alpha is required. For example, the "Unrated" version of a film may be cleared for worldwide release but only for digital sell through. An edit of the same film, removing specific scenes of violence or profanity, may be the only version cleared for TV distribution in one or more foreign territories. As a result, the DBB could select the Unrated version for a DST client and the edited version for a UK broadcast customer.

The Alpha will also be used as an organizing tool for asset inventory both digital and physical. Current business processes result in the creation of families of assets needed to service each Alpha. Picture elements of various aspect ratios and standards are created for each Alpha beneath a given title. Audio and text assets are then created to conform to these picture assets. Processes which support the creation, association and containment of all assets created to service a particular Alpha is required. At a minimum, ingest will require the identification of a specific alpha for all assets added to the DBB.

The Alpha concept also extends to the identification of Trailers. The identification of the Trailer to use for a specific client follows the same rules as would be applied to variable full program content.

Kits—components determined to work together (conformed and synched) should be organized. This will allow workflow master data to point to a Kit Type. Under the Alpha, the kit will allow specific confirmation of assets that will work together. A kit has one video component and one or multiple audio components where any audio will work with the video within that kit. Workflow master data (supported by client specs) will handle the variability of which audio or supporting material is used from within the kit. Current DIAMONDS assets (muxed audio and video) are a single kit.

The kit type must be known to the Workflow master data and must have attributes that will allow the selection of the correct kit based upon key values such as aspect ratio and standard.

Components—Components represent the discrete audio, video, text and/or combined assets that are stored as source assets for content processing. While the Component concept can be extended to archival or protection assets, its primary role is to allow unambiguous identification of assets that are required for specific manufacturing processes. Components can, in many respects, be considered similar to a "part number" in traditional manufacturing. Component organization may extend from the DBB to provide visibility into key physical assets.

The input of an asset into the DBB has three distinct parts.

a. Component Type—A Component Type represents a specification that describes the asset in as much detail as possible. The specification will determine the acceptable range of values for metadata fields that are key to content processing. It is envisioned that all components ingested into the DBB must be accepted against a Component Types in a similar manner to a material receipt in manufacturing terms. For example, a Component Type representing the 16×9 Letterbox SD video asset has flexible specifications that will allow each key field to be limited to values that match what is acceptable for the component. FIG. 16 shows a list of Aspect Ratio values that the asset would be limited to if it were to be a considered for this Component Type. Such definitions for technical data would extend to all inventory metadata values key to content processing.

b. Component Requirement—A Component Requirement (CR) is the request for a specific Component Type within a specific Title/Alpha. It is envisioned that CRs will drive the creation and ingest of assets into the DBB. CRs may be created as a result of a Request (Appendix 2 Partner-Client Relationships) or may be create through manufacturing planning activities where a mastering group will fulfill CRs necessary to ready a Title/Alpha for distribution. For example, the Theatrical Alpha for Spider-man 4 is in production for post theatrical distribution. The planning group identifies video asset requirements for the backbone for eight video Components. These are DBB master specification video assets varying in aspect ratio and standard, all needed to support downstream DBB production. This results in the creation of eight CRs which are fulfilled by the mastering group. When the assets are created to the component specification and delivered for ingest they will be accepted or rejected prior to ingest based upon examination against the specification requirements. Once accepted, the asset will fulfill the CR.

c. Component (fulfilled)—Once the CR is fulfilled through the acceptance and ingest of the asset the Component will become available to the DBB for processing. As described in Appendix 5 Workflow Master Data, each content processing specification may identify one or more components required to create the end product. Only when fulfilled Components exist for a particular Title/Alpha may a content processing specification be executed.

Assets—Rich media Assets within the backbone represent the essence(s) of the Components as described above. Assets are maintained with independent metadata as is common in most MAM/PAM systems. In the DBB, assets are also associated with the specific Component they were ingested against. The Asset metadata will allow the DBB to interpret content processing variables that may exist between titles.

Parentage—It is necessary that parent assets be recorded during encode and ingest. It is also necessary to record this information should new master Components be created within the DBB. This information linkage must allow users to trace the actual assets used to create any DBB asset back to the encoded physical master or ingested file.

Component Succession—In order to preserve unambiguous inventory it is important to control replacement of Components and prevent the entry of duplicates into the DBB. When a Component Requirement is created and there is an asset present in the DBB under the same Component and Title/Alpha, the system will manage succession by identifying the duplicate and indicating that resolution workflow is required.

3. User Interface

While the DBB is interfaced to a partner's Title master for Title/Alpha generation, the DBB UI will support direct creation of Titles and their associated Alpha's. It should be noted that parameters associated to both Titles (e.g. Title Type) and Alphas (e.g. Aspect Ratio) need to be entered via the DBB UI.

User interfaces supporting the Alpha require administrative configuration programs needed to create Alpha types. These types allow common Alpha types such as theatrical or directors cut to be standardized and used across all appropriate titles. These administrative programs allow business rule definition regarding the concepts of Territory and Market applicability described above. An additional level of administrative programs may be needed to create Alpha templates for the common business rules.

The creation of Component Type specifications is closely linked to Appendix 5 Workflow Master Data, and may be contained in an integrated suite of UIs. This UI requires the ability to create a record that includes the technical requirements a media source must meet in order to support designated workflows. These records are linked to the workflows, creating integrated inventory and content processing information.

4. Services

The DBB should possess exposed services capable of interfacing with a partner's Title master. For Sony specifically, these services support Title, Alpha and associated rules as described above.

5. Interfaced Systems

For the Sony Pictures Entertainment implementation, interface to the GPMS (Global Product Master System) is desirable. The DBB will store Title/Alpha data that is operationally necessary. The DBB will support the interface from GPMS for R1, but must be extendible to an API that will allow Partners to interface title data into the DBB. Interface to the GOLD System (Global Ordering and Library Database) will be necessary in order to provide the DBB with Component visibility to key physical assets. In order to provide visibility to costly manufacturing scenarios, it may be necessary to extend DBB Component visibility to key assets such as high definition video masters or dubbed audio languages.

6. Multi-Tenant

Each Partner owns any number of titles within the DBB. Inventory is separated based upon the organization of Titles under each partner. Users must be sponsored by a Partner and are provided rights to titles and their associated assets based upon that Partner.

APPENDIX 5 WORKFLOW MASTER DATA

1. Overview

The DBB supports automated workflow wherever possible. A review of current fulfillment processes indicates that for some processes, decisions regarding source asset selection, content processing requirements and even packaging may be governed by certain rules. For other processes, human intervention may be required to clarify ambiguity. With the continued consolidation of Client deliverable specifications and the simplification of source inventory enabled by content processing technologies, the internalization of rules regarding workflow processes becomes possible and increasingly desirable.

Additionally, providing exact specification details to automated content processing systems is a necessity. The errors introduced by a "make to order" model does not support many of the efficiencies envisioned in the DBB. The creation, testing and implementation of content processing workflows by engineering personnel provide a superior platform for consistent performance. The ability to call upon these workflows through the use of simplified rules will allow an efficient separation of labor that will enhance both customer service and content processing.

Workflow Master Data provides metadata around workflows that supports manufacturing planning. This metadata identifies the workflow needed to support a Client Specification. In addition, required Kit and Component information is supported outside of the workflow data in order to allow efficient interrogation of inventory. With this supporting information, the definition of a client specification and the Title/Alpha required allow the Manufacturing Analysis Engine to determine the appropriate source inventory requirements and the workflows needed to create Products. Workflow Master Data acts in concert with Inventory Metadata Organization (see Appendix 4 Inventory Organization) in order to support the requirements of the manufacturing planning (see Appendix 6 Manufacturing Planning).

While full automation is desirable, flexibility in an operational environment is also a key requirement. DBB Services and the workflows that coordinate them will be designed in a modular fashion. While workflows may coordinate the input parameters, actions and outputs of multiple services in an end to end process, they must also provide access to the basic services of the DBB. Key Tasks are operations that may have direct UI requirements that do not involve a Manufacturing Plan. These tasks, such as File Retrieval, Transcoding, Packaging and others must be executable based upon user defined parameters. This allows the full use of DBB services by operational personnel in order to deal with interim or special workflows that cannot be fully automated.

2. Description

Figure 17:
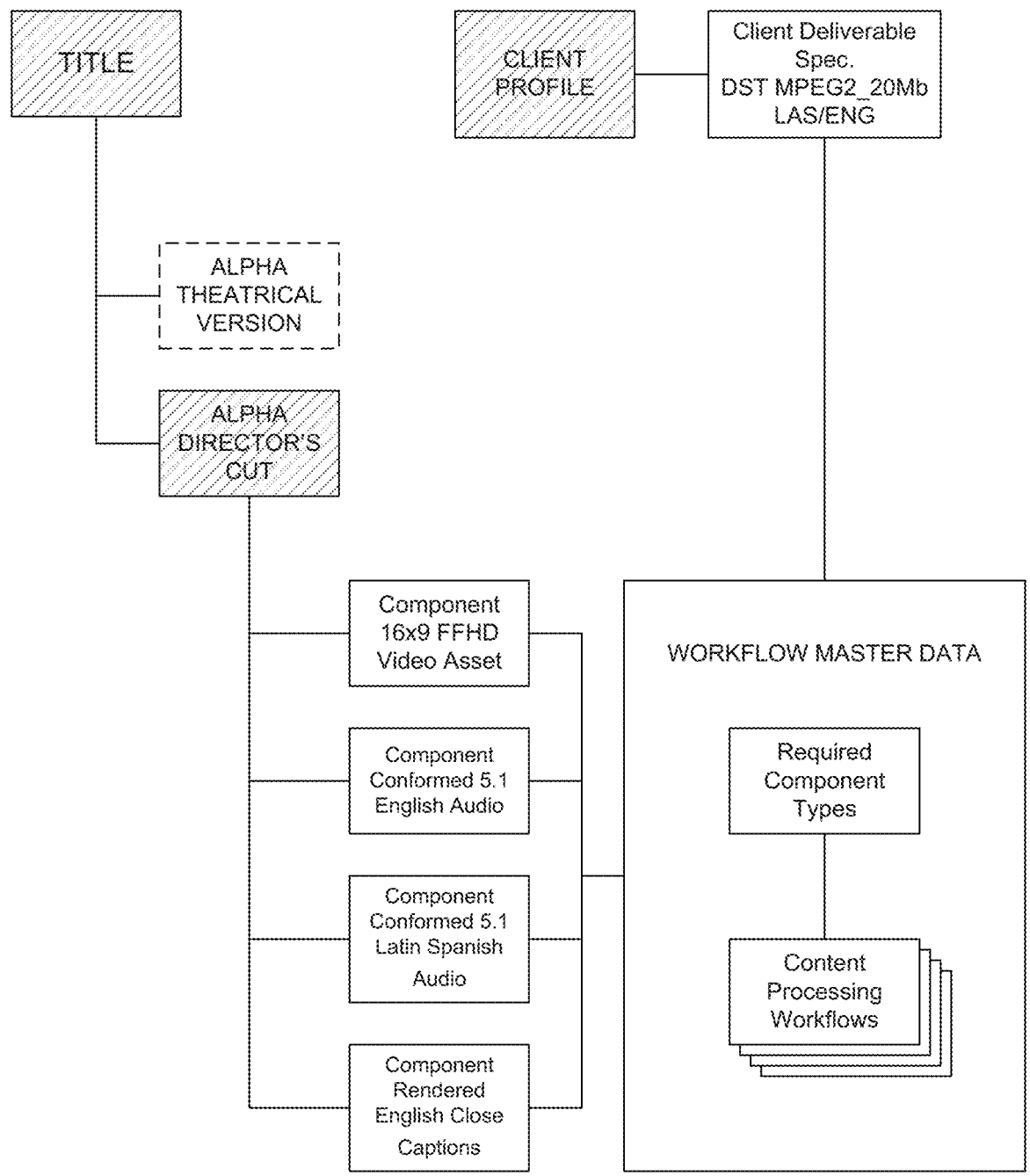
FIG. 17 describes the role of Workflow Master Data with DBB. The boxes in shade are choices defined by the Requestor.

FIG. 17 describes the role of Workflow Master Data with DBB. The boxes in shade are choices defined by the Requestor. Information in the unshaded boxes is derived from DBB Inventory and Workflow master data.

Workflows—Entity Relationships shown in FIG. 17 display an approach to metadata management where the core requirement is to separate the identification of Content and Client from the definition of the manufacturing plan. As the Requestor identifies the Client profile, DBB is able to identify the client specification. With this information the DBB is able to determine the workflow to be used to create the specified Product deliverable. These processes will be created and managed by administrative personnel and will be vetted through the onboarding process.

Client Spec Based Workflows—Manufacturing Planning is based upon the identification of Client Specs and Title/Alphas. Workflow Master Data defines the workflows necessary to complete a Client Spec and defines the inventory requirements of each workflow. This data allows "what if" scenarios to be run through the backbone without exercising the business rules of the workflows themselves.

A Client Spec based workflow will actually be a series of workflows that will be designed to conform to the state of inventory for a given title alpha. For example, a workflow designed to create an 8 MB Mpeg2 output will include steps encode and ingest the master video file if that file is not present within the DBB. If the file is present in the DBB, these steps will be skipped and the workflow will begin with a file retrieval step.

UI Based Workflows or Key Tasks—The workflow orchestration tool will be the key point of interaction with DBB Services. While it is desirable that client spec based workflows are the norm for distribution scenarios, all Key Tasks within the DBB must be available to operational personnel. For example, a manufacturing plan for an 8 MB MPEG2 for a German Language client requires a conformed and synched German audio track. The current kit needed to service this specification is missing the track. Due to a rush order, the conformed, synched track is delivered directly to operational personnel who then execute a Key Task designed to allow retrieval of specific files from the DBB, selection and execution of the appropriate transcode spec, packaging and delivery to the client.

Key Tasks will be specifically designed to support common operations and will support the requirements of production that cannot be automated based upon specific business needs.

Orchestration—It is envisioned that a workflow orchestration tool would be used to create, manage and orchestrate the tasks required to execute workflows. This tool should allow for the inclusion and interrogation of business rules that might be content, client or otherwise specific and which would materially affect how the workflow is executed and/or which tasks within the workflow are necessary.

Supporting Data—Workflows will govern Tasks to be orchestrated and their dependencies. These workflows will interact with supporting data that will facilitate inventory selection and billing requirements and other inputs. This data will include but not be limited to the following.

These workflows would generally include the following information:

a. Tasks—A Task is defined as any step within the workflow that is required to proceed from source master elements to a final client deliverable. These tasks will include Encode, Ingest, QC, Transcode, Watermarking etc. The workflow orchestration solution will allow the flexible creation/configuration of tasks needed to support both new content processing technologies and expanded automation. Tasks are the primary building block of content processing orchestration. Each task can be manual or automated and will have status and priority associated to it. See Appendix 7 Task Management for a full description.

b. Billing Transactions—Work performed must be associated with billable services within the DBB. Billing Transactions will contain information required for the interrogation of rate card information by the billing system. Appendix 13 Financial Processes outlines how Billing Transactions will be managed by the Backbone. Workflows are designed to accommodate the needs of financial reporting so that Billing Transactions may be created and reported (or "statused") as the workflow completes.

c. Kits—components determined to work together (conformed and synched) are organized together. This allows workflow master data to point to a Kit Type. Under the Alpha, the kit allows specific confirmation of assets that will work together. A kit may have one or more video components and one or more audio components where any audio will work with the video within that kit. Workflow master data (supported by client specs) will handle the variability of which audio or supporting material is used from within the kit. Current DIAMONDS assets (muxed audio and video) are a single kit. The Kit may also include closed captioning, subtitle and other content types.

d. Component Types—When necessary, the input Component Types required by a Task should be identified. This information supports the analysis of asset inventory when a Title/Alpha is specified within a Request. This information represents the core requirement for manufacturing planning and execution (see Appendix 6 Manufacturing Planning, Appendix 7 Task Management and Appendix 8 Managed Multi-Tiered Storage Environment).

Workflow Variables—Workflows allow the configuration of variables for content processing cases. For example, two video assets for different titles may share a common Component Type. However, the asset level metadata may indicate differences that would impact content processing. Variables within the Workflow Master Data would allow the selection of a different content processing Task or set or Task based upon the differences in the two source files.

The Process Flow diagrams provided cover the scope of work to be controlled by Workflow Metadata. The general categories of workflow are as follows:

a. Encode/Ingest—The entry of source assets into the DBB.

b. Product Transformation—Automated and manual content processing.

c. Metadata Creation—The creation of Client specific metadata.

d. Retrieval of Supporting Media—Manual or automated retrieval of supporting images, chapter stills etc.

e. Packaging—The application of packaging specifications to Product, metadata and supporting media.

f. Delivery—Delivery of Packages to Clients.

3. User Interface

The creation and maintenance of Workflow Master Data has a flexible user interface that allows content processing specifications to be identified, incorporated and linked into a specific Workflow. The UI allows the creation of records that represent workflows and must allow each workflow to be linked to appropriate Client Specifications and Component Types (See Appendix 2 Partner-Client Relationships). Workflows and associate Master Data must be easily copied and reconfigured. It should be noted that it is not assumed in R1 that the inventory organization information is fully integrated with the tool set/services that maintain and execute workflow master data.

Key Task user interfaces will be required to provide direct access to services within the DBB. These UIs will be discussed in greater detail in Appendix 6 Manufacturing Planning, Appendix 7 Task Management, and Appendix 8 Managed Multi-Tiered Storage Environment.

4. Services

The Manufacturing Planning engine will access the data, but may do so with simple database calls depending upon final architecture decisions.

5. Multi-Tenant

Sharing of workflow master data may occur across Partner instances allowing the workflow used for a common deliverable to be leveraged by multiple partners. However, this function would be administrative in nature. Both UI and data layers must be fully segregated in Partner instances. Rate Card information, as discussed above, must support variation by Partner and possibly special deal rates as well.

APPENDIX 6 MANUFACTURING PLANNING

1. Overview

Workflow automation must be supported by master data as described in Appendix 4 Inventory Organization and Appendix 5 Workflow Master Data. These sections and their requirements describe master data that is maintained across all inventory and content processing workflows. The DBB will utilize this master data to create specific manufacturing plans in response to requests from the Request Maintenance Module. These manufacturing plans represent the core instruction set for the orchestration of content processing and will generate the information points required for cost and lead time estimation.

While it is desirable to create and execute manufacturing plans without user intervention, it is understood that operational manipulation of these plans will be necessary to deal with uncommon cases. This information layer and its computational capabilities must remain flexible so that high rates of operational intervention early in the life cycle of the DBB may be supported and as these rates decline, high rates of fully automated planning may also be supported.

2. Description

FIG. 2 describes the entities and processes needed to create a Manufacturing plan in the DBB. The Manufacturing Analysis Engine utilizes Workflow Master Data and Supporting Inventory data described in Appendix 4 Inventory Organization and Appendix 5 Workflow Master Data along with input from the Request Module described in Appendix 2 Partner-Client Relationships. With the Client Specification, the engine can identify the appropriate workflow required. Within the workflow all Tasks needed to create the client spec are defined. Further, all needed Component Types for each Task are defined where applicable. With this information, the engine first performs a Materials Analysis. DBB queries DBB inventory for the needed components for the specified Title/Alpha and Client Specification. The results of this analysis determine the Tasks that are necessary to complete the Workflow required.

As describe in Appendix 5 Workflow Master Data, Client Specification based workflows will be must account for all possible inventory scenarios. These workflows must cover encode and ingest of needed inventory component through to delivery. They must be modular in nature and provide flexibility to handle scenarios where needed inventory is at greater stages of readiness. The Manufacturing Planning Engine will perform a Materials Analysis in order to determine the specific workflows necessary to create the needed Product.

A DBB workflow may include the transcode of a higher resolution file to a lower resolution file which is then packaged and delivered. DBB Operations may create the lower resolution file and store it in the DBB file storage system as a limited use alternate resolution master. In this case a workflow will be required to interrogate inventory, determine that the lower resolution file is present and chose an alternate workflow to copy and deliver the lower resolution file rather than transcode from a higher resolution file. For example, for Spider-man 3, the 8 MB MPEG2 file has been created and is stored in the file storage system. Within the required workflow, Tasks for the encode and ingest, retrieval and transcode of the of the Video Master file into the 8 MM file would not be necessary because the 8 MB, a limited use alternate resolution master already exists. In this case the workflow would be truncated. For Spider-man 4, the entire workflow, from Encode forward may be required as the alternate use file does not exist.

Depending upon detailed design, it may be necessary to rerun the manufacturing plan for cost and lead time purposes prior to executing the actual Workflows. The reason for this is the dynamic nature of asset inventory. Manufacturing plans may result in the expenditure of hard funds for Partners and as a result may require approval prior to execution. A single request supporting a client launch may require multiple approvals. During the approval period, conditions could change within DBB. The ingest of a needed master file could have occurred or an existing master file could be placed on QC HOLD. As a result the initial analysis could result only in an estimate of cost and lead time which would be used for COFA purposes outside of the DBB (see Appendix 13 Financial Processes). Once approved, the Manufacturing Analysis Engine would run a second analysis, check for substantive changes and if none exist, execute the manufacturing plan.

Cost Estimate—As described in Appendix 5 Workflow Master Data and Appendix 13 Financial Processes, the DBB will interface with a billing system that will store rate cards. Billing Transactions will leverage Rate card data in order to facilitate pricing computation. When a Manufacturing plan is created, variables needed for pricing computation are gathered based upon the results of the Materials Analysis and pricing is defined as determined by the identified Workflows. This information will be captured for use in the Approval Workflow.

Lead Time Estimates—Lead times for each process must be estimated and a total lead time for the Workflow must be developed. The method of computation is not yet known. True capacity planning may be beyond the initial scope of DBB. However, it is considered that the analysis of recent historic data could be used to estimate lead times.

Request Module Interaction—This information will be presented to the Requestor for approval. Lead time will be compared to due date to flag any potential conflicts or need for higher prioritization. Costs will be made available and will allow the user to initiate the Approval Workflow.

Manufacturing Plan Modification and Release—The Manufacturing Plan will consist of Source Component requirements, Billing Transactions, Lead Time Estimates and required Workflow. It is necessary for the manufacturing plan to be examined by business rules that might flag it for manual review and release by a DBB operational group. This could be based upon the existence of certain tasks, or may be flagged at the Request level based upon special circumstances. Rules for operational review of Manufacturing Plans must be flexible and configurable. This step is required so that the Plan may be modified by the DBB Operational group in order to account for unique or ambiguous circumstances. For example, a given workflow may specify a particular source Component. However, with client approval, a different, lower quality source file is to be used. These alternate source files are present in the DBB. The Request is flagged for operational review, and during this process, the source assets within the plan are modified. Once the modification is complete, the Plan is released for execution.

3. User Interface

One or more UIs are necessary to support the review, modification and release of Manufacturing Plans prior to COFA approval. UIs will also be necessary to modify Billing Transactions before or after COFA approval. See Appendix 13 Financial Processes for a full description of Billing Transaction requirements.

4. Services

Request level data may be submitted via web service. The Manufacturing Analysis Engine may then produce the necessary information and respond to the request. See Appendix 13 Financial Processes, for possible services between the DBB and the listed Billing System options.

5. Interfaced Systems

The Manufacturing Analysis process may require queries into supporting systems such as Sony's GOLD and/or CineShare applications in order to determine inventory availability.

6. Multi-Tenant

Level loading and prioritization of Tasks between Partners are desired in order to maintain consistent throughput.

APPENDIX 7 TASK MANAGEMENT

1. Overview

The DBB requires the ability to orchestrate Workflows as defined by Workflow Master Data. Manufacturing Plans allow the assembly, operational modification/vetting, approval and submission of Workflows for execution. Once submitted, a Task Management function interacts with the Service Layer of the DBB, submitting Tasks, obtaining responses, updating, logging and notifying as necessary.

Workflows and their respective Tasks manage ingest of source Components into the DBB. Further, the DBB has visibility into key Components of physical inventory and workflow management extends a communication layer to manual mastering or asset research/retrieval activities. Within this broad scope, it is assumed that any task could be configured to provide manual workflow instructions to a DBB provider or vendor. Technology and cost benefit analysis determines the extent to which any process is automated. The key requirement is that the status of Tasks and their dependencies for all Workflows from key physical asset creation to delivery confirmation be visible within the DBB.

2. Description

Figure 18:
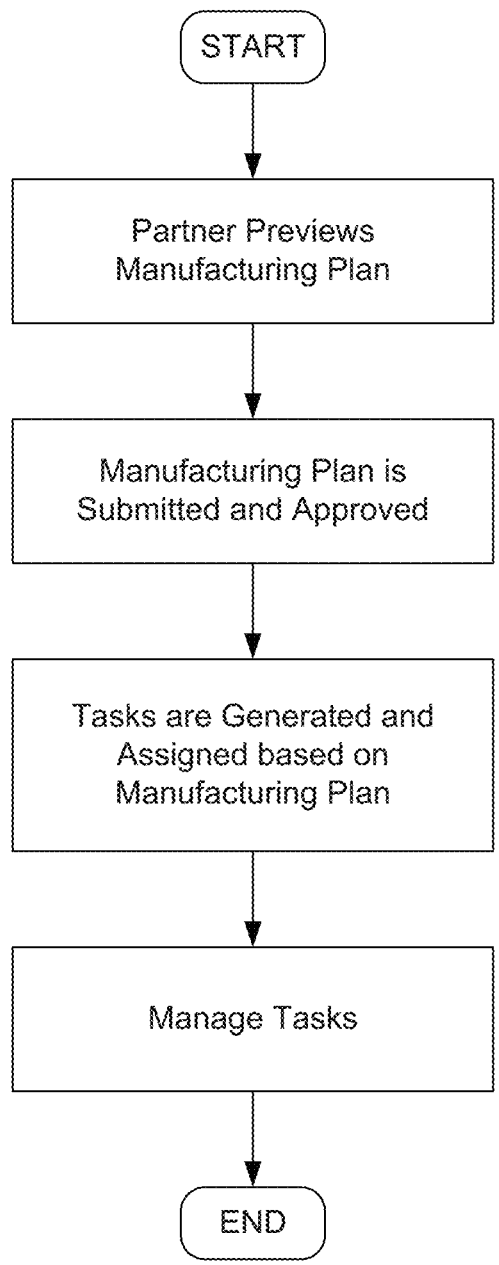
FIG. 18 shows the processing of workflow tasks and their constitution described in functional groupings.

A manufacturing plan is generated when an order is initiated in the DBB (see Appendix 6 Manufacturing Planning). Upon an approved submission, the manufacturing plan will submit tasks to a Queue Management function. The processing of workflow tasks and their constitution is described in functional groupings shown in FIG. 18. The technical constitution of these functions may vary depending upon detailed design and implementation issues.

Workflow Tasks—As Discussed in Appendix 6 Manufacturing Planning, a Manufacturing Plan includes Workflows necessary in order to fulfill an approved Request. At any time, multiple workflows may be in process, many of which requiring similar tasks to be completed by the same DBB service. In order to manage queues, control priority and provide visibility to status a Workflow Tasks must be materialized within the DBB. Workflow Tasks are added to the appropriate queues by a workflow orchestration tool. Data is maintained within these tasks regarding status, order of processing, begin and end time and operational information needed to define the nature of the task and its parent Workflow and Request.

Priority—Request level priority may be assigned in the Request Module based upon configurable user authority and/or Partner configuration. Request level priority may be changed during the Manufacturing Plan Modification stage described in Appendix 6 Manufacturing Planning. Priority may be modified at the Title/Alpha level allowing users to prioritize one or more line items within a Request differently than others. Workflow task level priority may also be modified within the Task Queue Management function described below. Task dependencies are set based within the governing Workflow.

Workflow Task Configuration—Workflow Tasks manage the execution of various services present within DBB. While Workflows Tasks may be prioritized, the analysis of the order of execution of a Task is performed at the service level so that all Tasks queued against a given service are processed in priority order. Task configuration supports monitoring thresholds that allow Tasks Management functions to perform analysis and report on late tasks or tasks that from their start time have exceeded a set duration. Task categories include but are not limited to the following:

a. Manual Task Management—A DBB Task UI allows communication of manual tasks to DBB Partner/Vendor service providers. This web enabled UI provides work queue information about tasks to be accomplished in support of DBB workflow. For example, this portal provides file movement capability facilitating the delivery of assets for entry into the DBB. This task type also facilitates non-financial review and approval workflow. It is assumed that email notification will be configurable to support these processes.

b. Encode/Ingest Workflow Management—All Tasks necessary to support the entry of assets into DBB including Component Request Creation, Encode, Logging and Ingest as described in Appendix 10 Ingest/Encode Management are required. Several of these tasks may be orchestrated through Manual Task Management described above.

c. External Reference File Delivery and Conformed Component Retrieval—In order to support the external creation of conformed assets, audio or video Reference Files may be delivered to a vendor with an accompanying URL to be used for delivery. This is a suggested workflow assistance that will provide structure for the creation of conformed/synched components.

d. External Web Service Integration—The DBB supports web service integration with external systems for numerous purposes. The primary purpose envisioned for the initial release is the retrieval of images, chapter stills, Title level metadata and other package requirements from CineShare, GOLD and GPMS for R1 and for other third party systems in later releases.

e. File Management—Tasks control the retrieval and movement of files to and from the DBB Storage System and support purge of files from WIP storage based on policy and workflow requirements.

f. Content Processing—Interaction with all identified forms of content processing devices.

g. Packaging—Generation of Package Metadata based upon customer specification and creation of Packages for delivery.

h. Delivery-Delivery of Packages to Clients by identified methods.

Financial Update-Any Workflow may be configured to provide status and/or other needed data to facilitate financial processes (see Appendix 13 Financial Processes).

Request Status-Workflows must provide task progress to Requests as configured in workflow business rules.

The following functions may be imbedded within the workflow orchestration tool but are required to manage the throughput of tasks through the DBB.

Queue Management—The Queue Management function monitors and maintains the throughput of the various queues within DBB and determines order of execution based upon priority and dependency. This function controls the rate/flow of Tasks through interaction with the DBB Service Layer.

Task Update—The DBB Service Layer provides status for each Task. Upon receipt of status, the Task Update function updates tasks to the appropriate status and provides logging and notification functions.

Task Monitor—This function monitors all Task management functions and queues, providing error reporting, processing time analytics and generally supporting queue processing integrity.

Task Management Operational UI—As a DBB administrator, management of workflows and their task that are both manual and automated are required. Managing priorities and order of tasks are one of the core functionalities administrators use to keep the content supply chain running efficiently.

Notification—Email notification is configurable at the Task level. These notifications are driven by rules based upon operational needs or by the needs of the Request (Requestor/Client notification).

Key Tasks—As described in Appendix 4 Workflow Master Data, Key Tasks are workflows that may be executed directly by operational personnel. These workflows require a UI to allow direct entry of input parameters. The UI requires the direct identification of source inventory for processing within the Key Task. Some examples of key tasks are file retrieval, content processing, and delivery, and may include any content processing activity.

3. User Interface

The Task Management Operational UI provides sophisticated methods of review and analysis for operational personnel. Tasks may be configured with tolerance levels that, once exceeded, trigger alerts and then are reviewable to operations. The selection and review of tasks by various criteria such as task type, Workflow, content processing farm, Client, Partner or Request will be necessary in order to quickly identify and resolve problems.

Key Task UIs rely upon the modularity of workflows and provide direct access to input parameters. These programs may work from a similar template as inventory search, identification and retrieval are common to most Key Tasks. Additional workflow UIs may be attached to this basic UI.

4. Services

A Workflow Orchestration tool may be used to interact with the service layer of the DBB, submitting tasks, managing exceptions, logging, notifying etc. This tool requires a variety of services in order to execute the tasks types above.

5. Interfaced Systems

The Reference Architecture depicts all planned interfaces for R1, but Task Management can also interface with CineShare for the retrieval of images, chapter stills and other non-rich media as well as to GPMS for Title level metadata. For Processes controlling financial transactions and for inventory visibility, the DBB interfaces with Sony's Xytech implementation, GOLD.

6. Multi-Tenant

It is preferred that workflow and task management UIs and services be a single instance and version, though clustered and have the ability to be distributed. This allows the DBB to prioritize work for multiple Partners for separate content processing equipment sets in cases where equipment sets are dedicated to one Partner or shared among multiple Partners. Workflow rules allow for different behavior based upon the Partner who initiated the Request.

APPENDIX 8 MANAGED MULTI-TIERED STORAGE ENVIRONMENT

1. Overview

The DBB requires the ability to manage and store large amounts of data on digital storage. Digital Files could be video, audio, images, text or any other media type that might be packaged for distribution to a DBB client. Given the current costs of storage and expected volume/size of files, a Storage System that includes a Managed Multi-Tiered Storage Environment (MMSE) is expected to be a requirement. It must provide a central point of storage which is more economical than a fully online solution as files can be stored on varying tiers/types of storage.

2. Description

Since the DBB has a digital repository of files, services related to file management will be required. One such service is the upload/ingest service (see Appendix 10 Ingest/Encode Management). In order to populate the DBB with files, an upload process is needed to move the file from an external source to the localized instance of DBB storage. All files should be moved to the Tier 1 storage upon initial ingestion until such time an approved service request has been generated to move the file to WIP storage or a policy moves the file to other tiers within the MMSE.

Another service required of the DBB is the Work-In-Progress (WIP) retrieval process. In order to support content processing services, files residing on an MMSE will first need to be copied to a WIP storage area where they will have direct access to content processing servers (e.g. transcoding, packaging). The staging of this file to the DBB WIP storage should only be executed once a Work Order has been fully approved and a content servicing manufacturing plan task has been added to the queue for processing.

The DBB should be aware of each instance of a file regardless of which tier of storage it exists on. The DBB should be aware of what files are required in its production queue in order to reduce unnecessary tape activity (i.e. if a particular source file has been requested on order #12 and the same file has been requested on order #215, the purge policies should take that second order into account).

In order to maintain capacity within WIP storage, retention and purging policies will need to be setup. These purging policies will be unique to WIP storage and could be based on several key factors including the following:

a. Timed Expiration—Once a file has been serviced and no pending approved manufacturing tasks require the use of this file, a timed purging event should be activated. This timed event could for example state that after 30 days of a file being untouched, the file should be purged.

b. Work Order Status Types—The completion of a servicing event can be identified by a couple different work order types and can trigger analysis of retention policies (i.e. most likely trigger a timed expiration). A "Cancel" work order type indicates that the work will no longer continue and hence the file is no longer needed to complete the work. Secondly, a "Complete" work order status would indicate that all activities including delivery and receipt of digital content have been completed. It should be noted that other work order types may be identified to trigger a servicing completion and these should be configurable within the application.

c. Pending Approved Servicing Task—At any point in time an approved manufacturing/servicing task requiring the use of an existing file residing on WIP storage could reset the timed expiration counter. This file would then remain on WIP storage without concern of being purged until the task is prioritized and executed against.

d. File Metadata—Retention policies may be driven by metadata associated to a file. In this example, trailers or other media may have a longer retention policy than long form video. The use of this could be numerous but the expiration/retention policies should be able to leverage file metadata as a criteria. It should be noted that only components are able to leverage this feature since they have necessary metadata.

Figure 19:
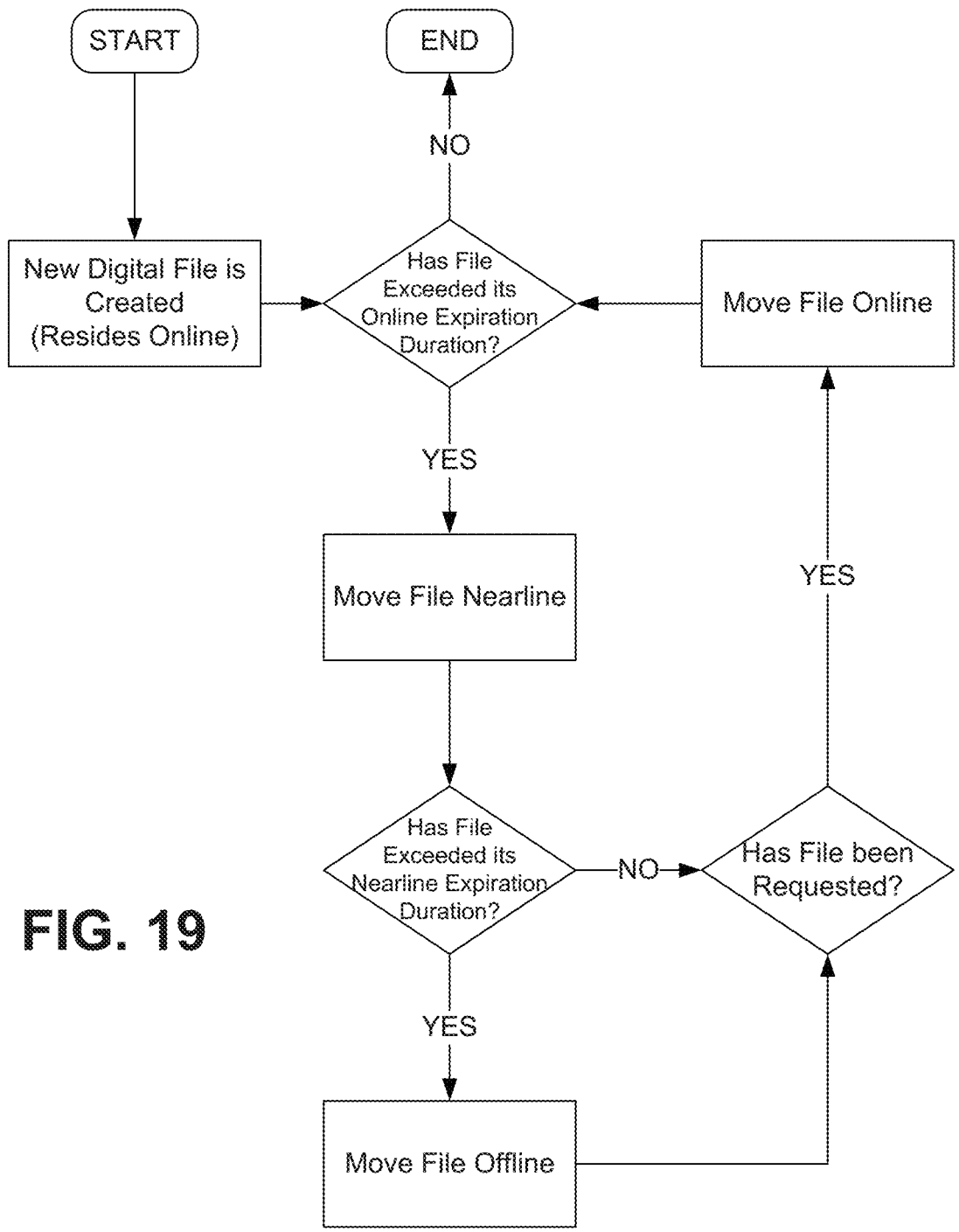
FIG. 19 shows the use of Managed Multi-Tiered Storage Environment (MMSE) functionality including the ability to move files between storage tiers.

The DBB uses an MMSE solution to provide a cost-effective scalable solution for storing its digital content. The Media and Entertainment industry works with large files, potentially exceeding 500 gigabytes per file depending on encoding/bit rates/run time. For this reason, cost and scalability are of utmost importance. The DBB requires the use of standard MMSE functionality including the ability to move files between storage tiers (e.g. nearline→online, offline→online) as well as setting up scheduled file maintenance rules within the MMSE solution to help with capacity planning. The storage tiers for the DBB are: Tier 1a—Online—Fast spinning disk; Tier 1b—Online—Slow spinning disk; Tier 2—Nearline—Tape library with automatable retrieval; Tier 3—Offline—Out of tape library with manual retrieval. See FIG. 19 for details.

Rules manage content globally within the DBB. Rules are setup to schedule movement of files between storage tiers based on file/component type. Each file/component type is setup with an expiration duration for each tier of storage as well as a high watermark of disk utilization. This functionality is expected to be extended via user interface for modification by Partner preference.

One area within Tier 1 of the Storage System should be dedicated to Work-In-Progress (WIP) storage and managed by the DBB. This WIP storage is used by various content processing services like Transcoding. Though the equipment used for these services occasionally first moves the content to local storage before processing the data, the hope is to improve processing time by removing the need to move these large multi-gigabyte files between data stores. This requires a very fast connection between Tier 1 Storage and the content processing servers to be successful.

The MMSE integrates with infrastructure management services to provide more proactive feedback regarding MMSE health. These services also integrate with other DBB hardware (e.g. content processing servers) to help evaluate CPU, Bandwidth and other criteria to help the DBB better orchestrate its services and alert administrators of potential issues.

The MMSE solution allows for a number of rules in regards to content stored on tape: The ability to prevent assets from being spanned across multiple tapes unless absolutely necessary to store an asset (i.e., asset exceeds size of entire blank tape in pool); The ability to segregate content types on tapes (i.e., choose to only have certain types of elements grouped on tapes) thereby preventing the need to have extraneous tapes filling tape slots simply to access one small element; The ability to have multiple copies of tapes for DR to take place at idle times and specific maintenance windows.

3. User Interface

Depending on the design, there may be little need for an end-user interface. There is an expectation that system administrators will be able to set default rules for managing media across the DBB environment. As these are controls only available to an administrator, this functionality does not have strict user interface guidelines and we expect to mostly use out-of-box functionality. There may be certain features however that are exposed via interface to DBB Partners. For example, depending on Partner preferences, certain content owners may require that all content remain on online storage rather than being moved to nearline or offline storage. Additionally, certain "Hot Titles" may be required to stay online for longer periods of time than standard titles. By setting these preferences, the DBB should be able to interact with the MMSE to pass values/parameters which make these decisions possible.

Most file management activities should be seamless to an end-user of the DBB and not require a user interface. The movement of a file between tiers within the MMSE and movement to WIP storage should be conducted in an automated fashion. The only information a user should be made aware of is the expected processing time required for file preparation (e.g. movement to staging environment) and file servicing (e.g. transformation). One scenario where a user interface is expected is for upload/ingest of supporting media. It should also be noted that several mechanisms exist for upload/ingest, FTP, Web-based upload and other delivery tools (e.g. Aspera, Signiant).

4. Services

There are certain MMSE features which should be exposed to the DBB as a service. The features expected to be exposed as a service are the following:

a. Moving files between storage tiers b. Setting metadata-based expiration policies (overwriting default rules)

All file management activities should be managed via services exposed to the DBB. To handle the file management requirements discussed earlier in this Section, the following services need to be exposed:

a. File upload service—This service should move a file from a Partner specified location to Tier 1 storage for the Partner specific tenant partition. An input to this service should specify if the file name should remain the same or abide by a file naming transformation expression.

b. File retrieval to WIP service—This service should receive as input a file pointer specifying the file to be moved and the resulting destination location of the file. The destination location will be the tenant partition of the WIP storage.

c. Manual Purging service—This service should receive as input a file pointer. In the case of a Partner manually initiating the request to purge their content, this service should purge all matching content residing on the MMSE after operations confirmation.

d. Retention service—The MMSE will need to manage their storage with retention policies. Whether this is MMSE functionality or an exposed service, both storage environments will need to evaluate multiple criteria prior to triggering the moving/purging of content. These criteria, described earlier in this document, should be inputs to this service and include Work Order Status Types, File Metadata, existence of a Pending Approved Servicing Task, and Timed Expiration.

5. Interfaced Systems

MMSE should be integrated via services to the DBB. These services are integrated into the DBB to enable calls from systems including DBB DAM or system managing DBB manufacturing plan for example.

Depending on the design of the DBB, interfaces may not need to exist to support most File Management features. Though there are a large number of dependencies on metadata as retention criteria, this data should all be available within the DBB and an external interface is not expected to be required. Upload/ingest are the only features that would require system interfaces however these interfaces would be handled via digital delivery tools (e.g. SmartJog, Signiant) and mostly setup via configuration.

6. Multi-Tenant

The MMSE and overall storage solution must support both dedicated infrastructure for a partner, as well as a shared model under which DADC serves multiple tenants from a shared storage pool. Given the sensitive nature of the digital files being managed within the DBB, a multi-tenant architecture should be designed and setup to handle all potential file movements required for content servicing. The MMSE storage should be capable of being virtually and logically partitioned to prevent cross contamination and file management activities should always be cognizant of the appropriate partition being used.

7. Total Cost of Ownership & Operation

MMSE is a core enabling foundation of the DBB. The MMSE provides a Total Cost of Ownership and Operation that does not diminish the financial benefits targeted by the DBB. It is also in line with the third party business targeted by DADC.

APPENDIX 9 SEARCH

1. Overview

The DBB requires search functionality throughout its infrastructure. Search needs to be conducted on internal DBB data (e.g. Partner, Clients) and across interfaces to external data repositories. However, future applications of Search will need to accommodate other interfaces including but not limited to DAM systems and Intellectual Property Management systems. The mechanisms which satisfy these requirements are not determined and solutions could be various.

2. Description

Search with regard to the DBB can be broken into two types: End-User-Driven Search and System-Driven Search.

End-User-Driven Search is what is commonly thought of when describing search features. End-Users conduct searches across the DBB for many different reasons. The following is a list of expected End-User-Driven search features:

a. Title/Alpha Search—Used by Partners to select the appropriate Title or Title/Alpha being requested. This requires an interface to the Partner's Title/IP management system and requires multiple input criteria including but not limited to:

a. Title (full textual wildcard search)

b. Title Type (e.g. Feature, Episodic)—Controlled list of values c. Specification Search—Used by DBB administrators to find appropriate specification. Specifications contain a great deal of detail where differences between specifications may be very minimal. The ability to quickly search and filter specifications to find the exact match is very important so the appropriate specifications are used.

d. Component Search—Used by Partners to research components existing in the DBB. Components contain numerous metadata fields uniquely describing each component. The component search mechanism should provide the ability to search across all metadata fields and filter results to uniquely identify the exact component match.

e. Supporting Materials Search—Used by Partners to search for supporting materials added to the DBB. These supporting materials have minimal metadata in comparison to Components. The level of metadata depends on how the document repository manages this type of media. At minimum search should include any available metadata like filename or folder directory structure.

f. Client Profile Search—Used by Partners to search for the appropriate profile for request. This functionality could be achieved via textual search or browse search where a Partner could navigate Client Profiles via hierarchy (e.g., Client>Client Profile).

g. Client Search—Used by Partners to select a Client for fulfillment. This should be a simple textual search on Client names or browse feature to scroll through available Clients within the DBB.

h. Request Search—Used by requestors to find in progress or submitted requests.

i. Manufacturing Plan Search—Used by operators or requestors when Manufacturing Plans are being defined/ created as well as post submission, which will occur at the Workflow and Task level (especially by status).

System-Driven Searches are conducted by the DBB to perform its built in features. The best example of this can be explained by looking at DBB manufacturing plan functionality. For example, to generate a request, a Partner specifies a Title/Alpha and Client Profile for delivery. Given this input, the DBB needs to conduct searches across existing components, both file and physical, and follow numerous business rules. These searches need to be configurable by system administrators and be executed upon manufacturing plan estimation.

The following is a list of expected DBB system searches:

a. Component Search-Queries conducted by DBB to find best matching component given a number of metadata criteria. Data provided by the DBB as inputs for search could be pulled from multiple sources but are generally driven by a Request or related information. Inputs include but are not limited to:

Title ID—This is data selected by a Partner during the Request process.

Alpha—This is data selected by a Partner during the Request process.

Partner ID—This should be used as a filter to specifically search Components created by a specific Partner. Note: Components are not shared between Partners.

Additional Spec Metadata—This is data specified in the Specification associate to a Client Profile. This information would be known as the Request would require the Partner to select a Client Profile. Sample specification information could include technical metadata like bit rate and format.

3. User Interface

Irrespective of design, certain search criteria inputs require end-user entry. Search interface should require as minimal user interaction as possible. Depending on the UI screen, several design concepts should be possible to enable an effective UI. For all search types, the use of "wild cards" or partial matching should be available (e.g., "Spid" returns results for all results for "Spiderman").

a. Basic Search—Most common search interface, where one textbox is used to provide textual input, but searches across a number of predefined fields.

b. Advanced Search—Searching across the data source(s) by designating search parameters for a number of metadata fields before execution to create more defined search criteria (e.g. date ranges, multi-select).

c. Facet-based Search—Search option that provides additional relevant attribute capable of filtering result sets in a dynamic fashion. The count of retrieved results should be indicted next to each "facet."

d. Search Refinement—Ability to search within a returned result set add criteria in order to refine the results.

e. Suggestions—Ability for fuzzy matching or logic. Characterized by "did you mean . . . ?" type logic. Ideally, index based "look ahead" suggestions would be available.

f. Result Navigation—Ability to traverse a Search result set by defined taxonomy/groupings.

Search results should be returned in a set that can be reviewed in its entirety or via a pagination strategy. Additionally, should a result set exceed a threshold to be defined, the system will prompt the user to refine their search criteria.

Additionally, the speed/responsiveness of the Search services is critical to the usability and efficiency of the DBB.

4. Services

To enable search across internal and external systems, search services need to be created and exposed to the DBB for each external/internal data source. The reason for exposing these search interfaces as services is because the interfaces will most likely be used in multiple scenarios for different purposes throughout the DBB. By creating common services, these will be more easily leveraged. For each data source, a service should be exposed to query each type of data. Additionally, it might be requires that indexes be created that span data sources and services in order to provide the necessary response times.

Services should be extensible to provide querying and data retrieval of all available metadata for a particular data type (security permitting). For example, if a service is created to query an external Intellectual Property Management system (e.g., GPMS for Sony), the input should be intelligent enough to provide multiple criteria for input (e.g. Title Name and Title Type). The service should also provide a means of specifying the metadata fields desired for output (e.g. Title, Year).

5. Interfaced Systems

Several systems/sub-systems are expected to be queried to enable data sharing. Some of the systems identified are the following:

a. Media Asset Management—The DBB internal Media Asset Management sub-system and its constituent services need to be queried when conducting materials analysis for manufacturing plan estimation.

b. GOLD/Asset Management—The DBB system needs to interface with the external existing asset management system, GOLD, for sources to retrieve asset metadata during the Manufacturing Planning.

c. Work Order—The DBB system needs to store data related to work being conducted by the DBB in order to properly assign tasks and then interface data to facilitate the invoicing of Partners for work completed. In order to minimize double entry for Partners, the DBB is looking to receive work order line items/requests via system integration where possible.

6. Multi-Tenant

There are no specific multi-tenant requirements for Search outside of the need to be able to filter search results by Partner as a passed value.

APPENDIX 10 INGEST/ENCODE MANAGEMENT

1. Overview

The DBB manages the process workflow for the Encode (or capture) and then Ingest of components. In this orchestration, starting with the request for the creation of new components in the Manufacturing Plan through their acceptance into the DBB, metadata will be inherited, captured, and verified via manual and automated processes to support the creation of clean data and thus unambiguous inventory.

Encoding, also referred to as capture, is a largely manual process of creating master files usually from a physical tape, but can also be created from a file. It is important that this be a managed process such that status can be known about a particular, or set of, encodes. Additionally, as an external vendor would then enter the required metadata and transfer the file to trigger the next phase in the process, Ingest, a managed workflow would allow for that to be tracked as coordinated as well.

The Ingest process as defined within this document starts with the receipt of an Encoded component or set of components, likely within a wrapper. It is intended that outside of a rare exception flow, components cannot be Ingested into the DBB without a waiting Component Requirement that was created via a Manufacturing Plan (a Reactive process) or from a File Mastering request (in a Proactive creation process). From the receipt of file(s) step the received file(s) pass through a number of automated and manual steps to validate the integrity of the file, perform quality checks, execute a technical logging process, and then formally ingest the file(s) into the DBB storage system and update/create the necessary metadata for the component in a waiting Component Requirement.

2. Description

Figure 20:
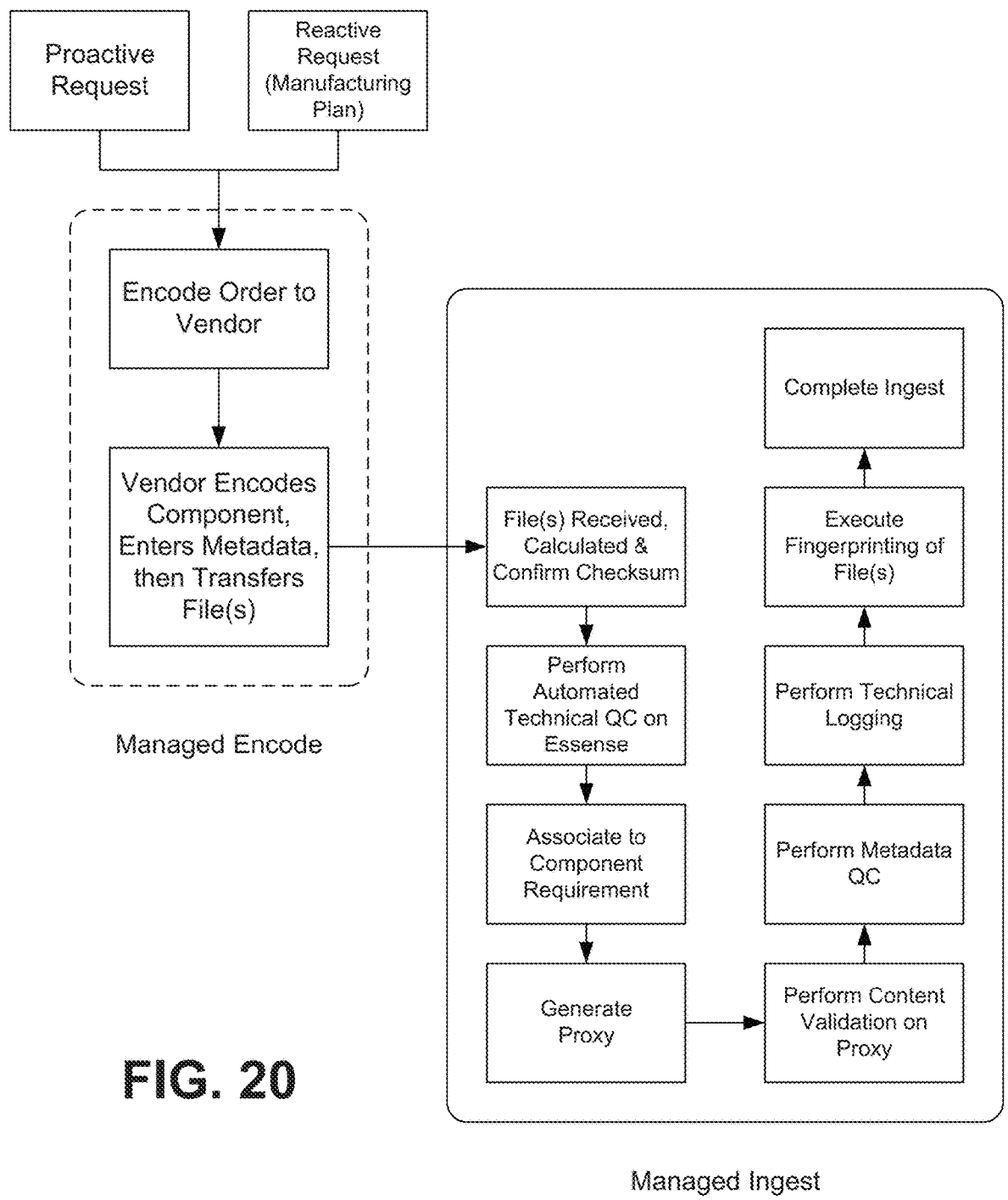
FIG. 20 outlines the Encode and Ingest Management process that should be orchestrated by the DBB.

FIG. 20 outlines the Encode and Ingest Management process that should be orchestrated by the DBB.

Specification based Encode and Ingest controlled via requests and managed workflow is a key concept for DBB as it pertains to maintaining a well formed inventory with the necessary metadata and relationships to facilitate automation. A Component Type specification can be created and maintained by operations as defined by a Mastering/Assets Management group as a generic template and control for requesting the creation of and then receipt of incoming assets. A Component Requirement represents a request for a specific type of Component(s) against a Title/Alpha and creates a shell record to be received against, the Component Requirement. This allows rules to be put into place that ensure uniformity of inventory metadata.

Component Requirements are created via requests in two primary ways:
 a. Reactively from Manufacturing Plans that allow Components to be encoded and then Ingested for use in pending orders, and
 b. Proactively based upon mastering plans that result in the creation of components for new digital releases (Features and TV content).

The vendor performs a defined amount of content QC before initiating the transfer of the file(s) as defined in the Master Specification to the DBB via an application interface extended to the vendor that begins the Ingest process. A service, either running at the vendor or remotely, would also provide a method for the vendor to enter the required metadata about the Component(s) as well as to allow checksums to be calculated for the file(s) to be validated after transfer to ensure movement of the file(s) do not introduce corruption or truncation.

The Ingest process starts with the start receipt of the file(s) usually after the completion of an Encode. The Ingest process automatically verifies the checksum, including unwrapping the content if necessary (pending final definition of the delivery package specification from Encode vendors).

After completion of checksum validation, the Component metadata and the file(s) are quality checked to ensure that the defined characteristics of the asset are within the tolerances of the Component Type Specification. Technical characteristics are automatically extracted from the file(s) and metadata is validated based upon what is achievable in an automated Technical and Content QC. A log of results from any automated QC process should be retained and stored in the system for future reference.

Once the integrity of the Component(s) are verified, a match is performed for the received file(s) to the waiting Component Requirement based on the metadata on the Component Requirement record in the system against the metadata that should accompany the file(s) from the vendor. This is an assisted manual process whereby the association only requires confirmation in most cases, but it is also required that asset record may be manually matched to a Component Requirement in a list should multiple options be systematically identified (usually as a result of bad incoming metadata) or, if no options are identified by the system, via search.

The next process is to generate a high fidelity, frame accurate proxy to be used in the following steps. Using the proxy, there will be some amount of additional manual examination of the file(s), such as verification of audio tracks and aspect ratio, and its metadata before the final ingestion into DBB.

The next step is the technical logging for the Component. This is currently only contemplated for video Components (and associated audio Components if they are in the same Ingest process) and is contemplated as a manual activity. The technical logging function involves the capturing of Component segment identification (i.e. bars/tones, commercial blacks, logos, program) along with timecode information for each segment (in and out points) and cropping coordinates as necessary. Additionally, it is preferred that this technical logging process be conducted on the frame accurate proxy versus the actual essence file as the file sizes, especially for HD, will become unwieldy. Additionally, while this is planned as a manual task, it is also desired that some amount of indexing and auto-matching/identification of segments be suggested that could reduce the manual effort to a largely verification/tuning of the technical logging data.

Fingerprinting is a process that is then performed on the file(s) to create a unique signature for the file that can later be used to uniquely identify the Title/Alpha. This may or may not actually occur after the file is actually within the storage system of the DBB as that might be more efficient as Manufacturing Plans may be queued waiting for this asset.

The final step in the Ingest process includes a file integrity validation, comparing the originally captured checksums, and then the transfer of the file from the Ingest process location into the DBB storage system for management. A final confirmation of the Component Requirement data and the incoming metadata accompanying the Component file(s) will be performed and may be validated by an operator. Additionally, within the system the Component Requirement would be updated a fulfilled status and provide that visibility throughout the system.

There are some variations to this process in the cases where audio only or closed caption (CC) components are being put through the Ingest managed process versus when conformed video and audio components are being ingested together. As before, they are the results of requests and come out of a managed Encode process. The major difference in this flow is that to ensure that these components will conform to the video asset it is intended to be associated to it will need to be confirmed against a reference copy of the audio. This can happen on the server side via a specific proxy created for the verification of conformance for audio and/or CC. Alternately, this can be performed locally, though locally is less preferred due to the requirement of moving the reference video from the DBB to the workstation.

Once the audio only or CC component is Ingested into the storage system it is also required for this type of asset for it to be associated to single or multiple Kits. This process is assumed to be manual and would either be done ahead of time as part of an Inventory Control function using the Component Requirement or after Ingest when the Component Requirement is fulfilled.

Finally, there will be specific "Replacement" variants of these workflows to allow for the necessary business and system logic for assets that are already in the system, but are being replaced due to rejection or re-mastering efforts.

3. User Interface

A user interface (UI) needs to be accessible to both Encoding and Ingest operators that can be different vendors that may or may not including internal. Thus, it is required that while being rich and interactive, the interface should be securely presented to its external users and also be intuitive as it can be assumed that external vendor training will vary. Different vendors using this UI should not have visibility to files being acted upon by others. Additionally, a service as mentioned above, preferably with a UI, would be required to assist Encode vendors with initial Component pre-transfer prep such as metadata entry and checksum calculation.

Also, to meet the Kit creation/update requirement noted above, a UI is needed to associated fulfilled Components and Component Requirements for audio only and CC assets to Kits.

4. Services

There are a number of Services that are required to support the Encode and Ingest workflows. At the most basic, as these processes are managed workflows, the Workflow Orchestration services should be utilized to facilities the tasks within this process and capture process metrics. Encode Services themselves are not directly considered part of the DBB and are expected to be third party tools leveraged by vendor to create the Component file(s) as defined in the Master File Definition. However, an Encode pre-transfer service/application would be required to allow the vendor to create a checksum before moving the files into the Ingest process to ensure file integrity.

Within the Ingest process, there will need to be several services some of which will be centralized and others which may need to run locally. These Services include the File Movement Checksum, Fingerprinting, Automated Technical and Content QC, Content Processing (as necessary), Metadata Validation, and Technical Logging.

At the end of the Ingest process, the File Management, Storage Management, and Metadata Management Services are called to put the file(s) under management of the DBB within its storage system as well as its corresponding metadata.

The Kit association function would primarily leverage the Metadata Management Services.

5. Interfaced Systems

There are no direct interfaced systems required for this functionality. However, as it is intended that the inventory in the DBB be reflected in GOLD, metadata for the incoming Components needs to be synced/updated into that system.

Additionally, it would be ideal that the components/toolsets used in this process that are not directly part of the DBB be interfaced to more tightly integrate the overall system and any remote data and interactions.

6. Multi-Tenant

There are no specific multi-tenant requirements other then the system must be able to support content being encoded and ingested from multiple locations and be able to identify (via metadata) to which Partner the content belongs.

APPENDIX 11 PACKAGE METADATA

1. Overview

This document describes the processes and functionality required to assemble the various types of metadata required for delivery as part of a package.

2. Description

Figure 21:
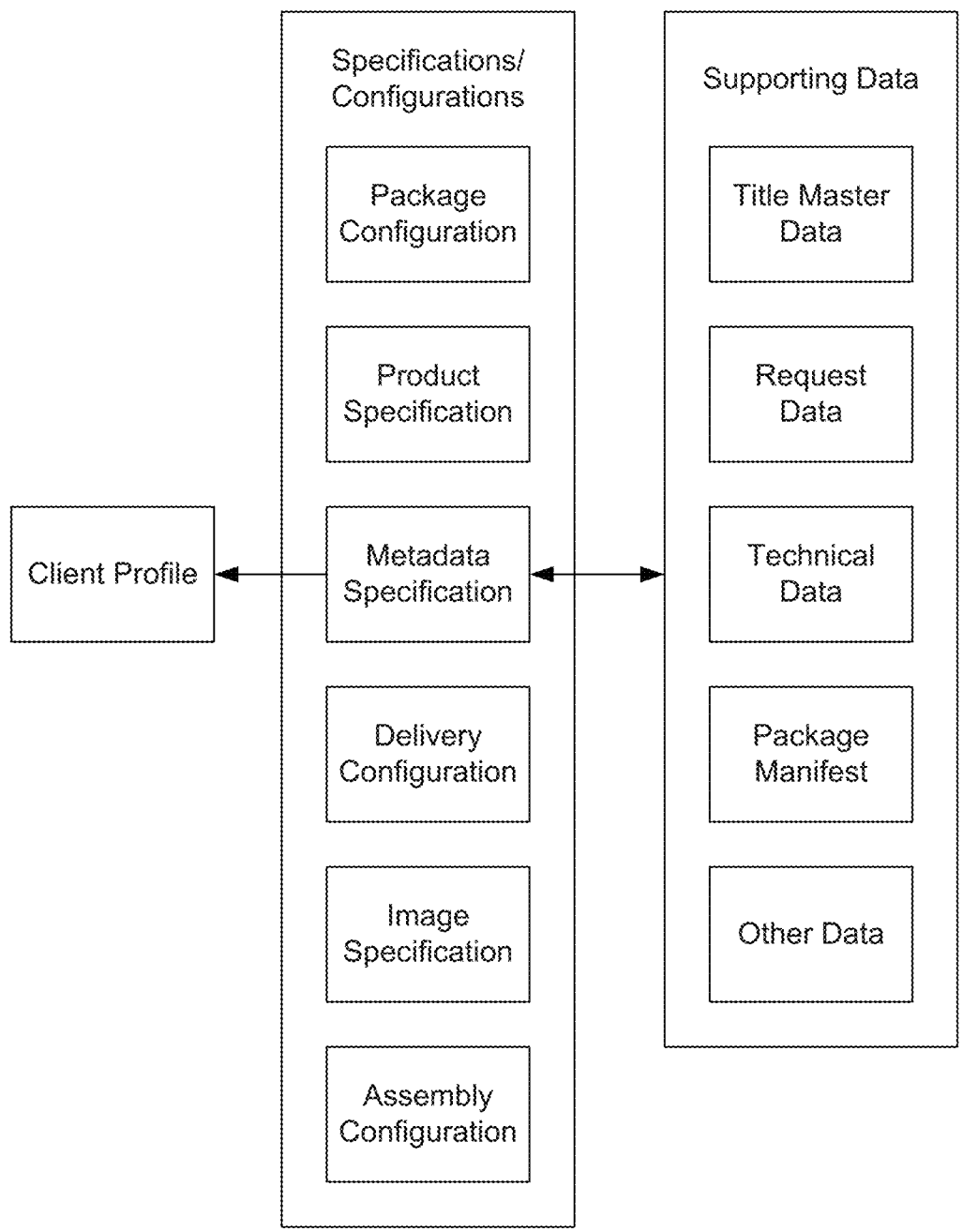
FIG. 21 is a sample entity relationship diagram depicting the relationship between a client profile, its associated metadata specification and the supporting data required to assemble the package metadata according to that specification.

FIG. 21 is a sample entity relationship diagram depicting the relationship between a client profile, its associated metadata specification and the supporting data required to assemble the package metadata according to that specification. The purpose of this diagram is not meant to define the final design but meant to help describe the types of relationships expected to satisfy SPE future state process maps.

Client Profile—The Client Profile acts as the source of reconciliation throughout the entire DBB manufacturing process to ensure what is being created matches client requirements.

Metadata Specification—Defines the metadata requirements for a particular client profile. The metadata specification indicates what metadata is required, where each data element is located, how it is mapped to the DBB metadata canonical and what, if any, transformations are required in order to provide the metadata in the client's preferred format.

Supporting Data—Supporting data constitutes all of the data that is required to be delivered as part of a package. This data can be found in various DBB data stores, i.e. Request, Title/Master and File Repository and must be mapped to the Metadata Specification. In the event that additional data outside of the DBB is required, it will be provided as supporting material to each request via an interface (user facing or system-to-system).

Title Master Data—A Title is the master data describing the intellectual property which is maintained within the DBB as the highest level of organization for its content that allows it be searched on, retrieved and manufactured against in order to fulfill a Request. Examples include title, synopsis, talent, genre, rating and copyright line.

Request Data—Request data contains information specific to the deal terms that were used to generate the request. Examples include sales start date, sales end date and price.

Technical Data—Defines metadata specific to the assets and/or files included in the package such and contains elements such as asset type, file name, file size and checksum.

Package Manifest—Defines the contents of the package. This could include a listing of all of the assets provided for each title.

Other Data—Various clients may have additional metadata requirements that we have not discussed such as chaptering metadata. For this reason, metadata specifications need to be completely flexible allowing the addition or removal of data to support client needs.

Metadata Canonical

The DBB requires a metadata canonical which removes variability and imposes a strict lexicon to ensure a common metadata language is spoken both at the field and value level. Partner metadata specifications are mapped against this canonical to provide a consistent reference point which will ultimately facilitate mapping to the individual client metadata specifications. The metadata canonical must support multiple languages and other regional specific data formats (e.g. date, currency, etc.).

Metadata Mapping

Each source DBB metadata attribute and its associated values of the Partner metadata specification must be mapped to the metadata canonical. Similarly, each client metadata specification should be mapped to the DBB metadata canonical. This provides the efficiency of only having to map a client once as opposed to once per each partner that distributes content to it. It also adds a layer of abstraction protecting the mapping from data model changes over time.

Metadata Transformation

Each client may have specific requirements surrounding how a particular data element is provided. This could be as simple as a particular date format or more complex such as specific translation rules. For instance, a client may have their own genres to categorize content. In this case, the genre value will have to be translated from the DBB genre. These transformation rules must be easy to manage and should be implemented with limited to no technical development if possible.

Metadata Versioning

Changes to metadata must be audited and historical data must be maintained. It is important to know what metadata was sent to a client as part of a package. However, a client may reject a package due to "bad" metadata. It is necessary to understand exactly what was sent to ensure the same "bad" metadata isn't resent. Conversely, it may be required to resend exactly what was originally sent even though data could have subsequently changed. Since packages are not maintained indefinitely, reconstructing the metadata that was sent should be a function of finding all metadata which was originally sent to the client. Some clients, depending on their client profile, may require most current metadata to be sent.

3. User Interface

A user interface must exist to manage the mapping of Partner specific metadata elements within the DBB to the metadata canonical. Similarly, a method must exist to map client specific package metadata elements to the canonical. Additionally, there must a user interface that allows metadata that exists only within the DBB to be added or edited.

4. Interfaced Systems

The DBB will maintain its own data stores for the type of data that will be included in package metadata. Nevertheless, the DBB may need to interface with additional systems to provide package metadata (e.g. GPMS).

5. Multi-Tenant Requirements

Future partners may have specific package metadata requirements that will impact Metadata Canonical, Metadata Mapping and Metadata Transformation.

APPENDIX 12 PACKAGE CREATION/MANAGEMENT

1. Overview

This document describes the processes and functionality required to create and maintain packages. A Package represents the compilation of one or more products created to client specification along with any additional materials required per the agreement between Partner and Client.

2. Description

Figure 22:
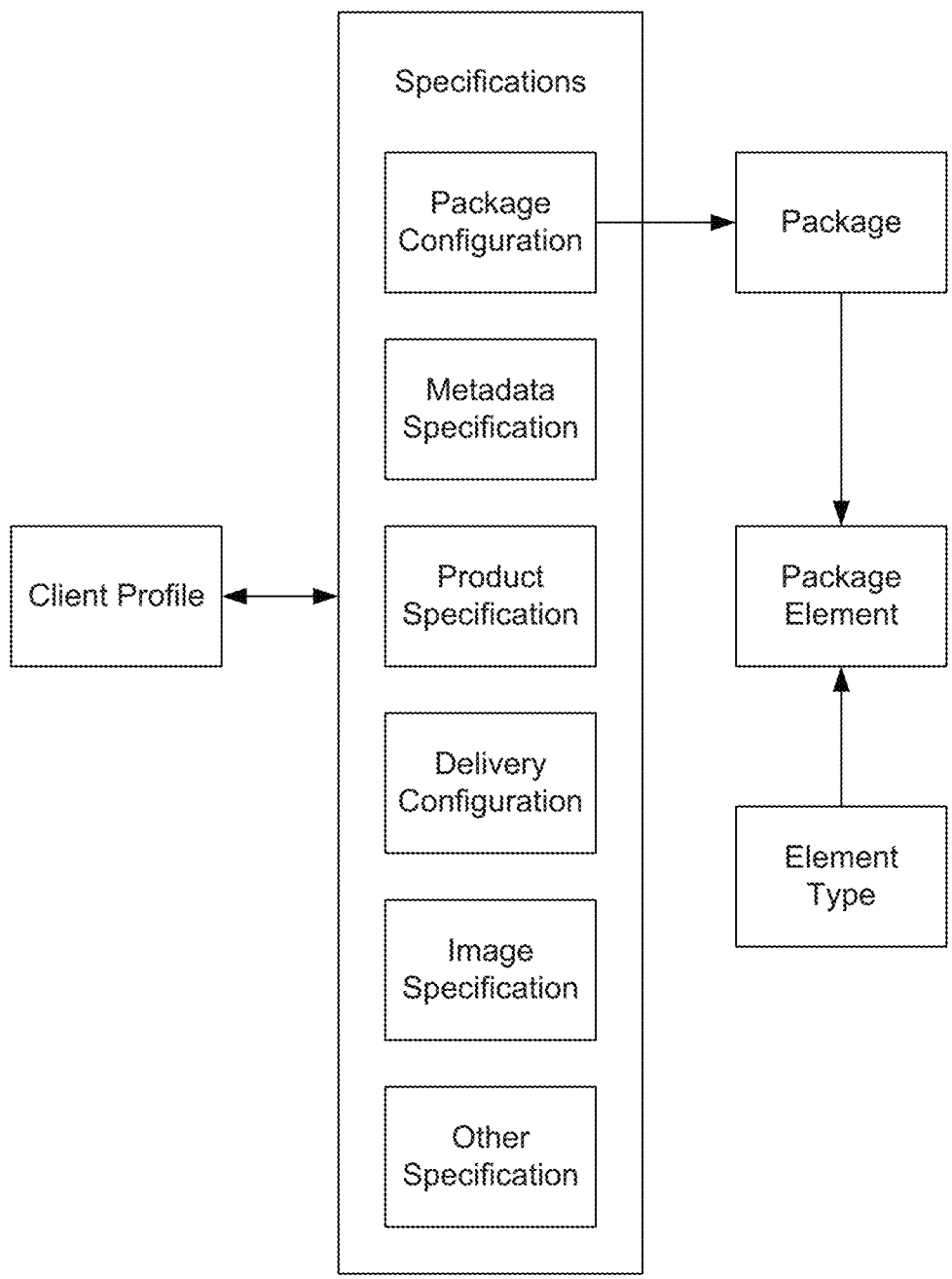
FIG. 22 is a sample entity relationship diagram depicting how Packages are expected to relate with Client Profiles and Specifications.

FIG. 22 is a sample entity relationship diagram depicting how Packages are expected to relate with Client Profiles and Specifications. The entities in blue are defined in other whitepapers while those in teal will be introduced in this document. The purpose of this diagram is not meant to define the final design but meant to help describe the types of relationships expected to satisfy SPE future state process maps.

Client Profile—Defines a set of client-specific deliverable requirements and supports automated workflows for delivery, status tracking, billing, and product/package creation. Includes configurations, specifications (per title type), and profile-level metadata.

Package—Defines the compilation of one or more products plus any additional materials or content required per the agreement between Partner and Client that will ultimately be delivered as a part of the Request fulfillment.

Package Specification—Defines the content, or Package Elements, required for a package to be considered complete. Package specifications will vary based on two primary criteria: the type of product being delivered and the client to whom it is being delivered. For instance, a package specification for a feature may be different than that for a television episode. Similarly, a feature package specification for iTunes may be different than that for a broadcast client.

Package Element—Defines a discrete piece of content required to be part of a client package. Each package element will have its own specification based on its type of content or Element Type. For example, a Metadata package element would have a Metadata Specification, a Packshot would have an Image Specification.

Element Type—Defines the type of element, i.e. Trailer, Chapter Still, Packshot, Metadata, Music Video, etc.

The Package Creation process can logically be divided into three sub-processes as follows: Content Gathering; Package Assembly; and Package Maintenance. Content Gathering represents the activities which are responsible for identifying and/or localizing all of the required package elements within a request. Package Assembly ensures that all required package elements have been gathered, performs any processing required to conform the package elements to client specification (i.e. transcoding, watermarking, XML transformation, DRM, etc.) and organizes the package elements according to the package specification. Package Maintenance represents the processes that control the package after it is created.

Content Gathering represents the activities which are responsible for identifying and/or localizing all of the required package elements for the products within a request. Package Specifications are envisioned as the mechanism to inform the Content Gathering process as to what needs to be gathered. A package specification needs to contain the following information:

a. Which package elements need to be included, i.e., trailer, images, metadata, etc.

b. How many of each package element are required, i.e., 2 trailers, 4 images, 1 metadata.

c. Where each of the package elements can be found and what criteria is used to find it (file system location, DAM search criteria, web service call, etc.).

d. The client naming convention of each package element.

e. The organizational scheme of the package elements (i.e. loose files, zipped by product, specific directory structure, etc.).

Content Gathering begins by determining whether or not package elements are available for a given Request. The DBB should surface the status of each package element within the Request UI enabling the appropriate user(s) to see what still needs to be gathered to fulfill a Request.

Where DBB actually looks to gather package elements will be a design decision. One option could be a Request based WIP area where all content required for a Request is staged. Another option would be to store all required content in a DAM. This would require a standard metadata canonical to enable DBB to locate content based on a combination of Request and Package Template attributes such as Request Title, Request Territory and Package Template Content Type (i.e. Title=Quantum of Solace, Territory=US and Content Type=Packshot). The process should be as automated as possible with the minimal number of content movements. Accordingly, the DAM solution has inherent advantages in that content can be ingested once and reused for multiple requests, whereas, a manually populated WIP area will need to be re-populated for each Request that is processed.

As specified above, file naming conventions will also need to be automatically generated in certain cases within the DBB in order to satisfy Client delivery requirements. These file naming conventions vary between Distribution Clients and are generally composed of a series of abbreviated and concatenated metadata values describing the asset. Naming conventions should be specific to a particular Client but also configurable to a Partners needs. In order to define a file naming convention, a DBB user should be able to select a series of metadata fields (e.g. Title, Aspect Ratio), fixed strings (e.g. "_" "-"), or other defined variables (e.g. current date, current time). The text resulting from the metadata inputs can be modified based on a number of different criteria specified by the DBB user. Each of these criteria can be used individually or combined in series (e.g. remove vowels then crop to max length of 10 char).

The following criteria can also be applied to a specific metadata input or the entire expression:

a. Crop to length—(e.g. crop the Title field to 10 char. "Transformers" would be "Transforme")

b. Remove vowels—(e.g. remove vowels from Title field. "Transformers" would become "Trnsfrmrs")

c. Lower/Upper case—(e.g. Title field upper case. "Transformers" would become "TRANSFORMERS")

d. Remove special characters—(e.g. remove colon from Title. "Stargate: Infinity" would become "Stargate Infinity")

Given the flexibility required for this data manipulation, complex manipulations may be best handled using a Regular Expression (e.g. RegEx) processor.

Content Gathering is completed when all required package elements have been identified and/or staged. However, some level of operational control must be maintained to enable a package to be created, and hence, a request to be fulfilled, even when certain package elements are not available. This implies that an authorized operator requires the ability to begin the Package Assembly process even if the Content Gathering process has not completed. Some of these requirements may be fulfilled by business rules which indicate which package elements are truly required for delivery. At the highest level, an operator must be able to send 'as-is' regardless of what the package specification dictates.

Package Assembly can begin once package elements have been gathered. Its purpose is to prepare and organize the content as described in the package specification. Each package element will have its own specification. For example, a trailer may need to be delivered in a specific format, aspect ratio and bit-rate; metadata may need to be transformed into a client specific format. DBB is expected to leverage the appropriate specifications in order to know what transformations need to be applied. In assembling the package, DBB will perform some combination of the following based on the package specification and package element specifications:

a. Determine whether and at what level (package or package element) encryption is required and apply where necessary.

b. Transform images, supporting video elements (i.e. trailer, music video, etc.) and metadata.

c. Apply forensic watermarking if required.

d. Apply DRM to products if required.

e. Apply client specific naming conventions to package elements if required.

f. Organize package elements into directory structure.

g. Combine or wrap the package elements, i.e. Zip, stuffit, MXF Package Assembly is completed when all required package elements have been processed to their appropriate specification. However, some level of operational control must be maintained to enable a package to be created, and hence, a request to be fulfilled, even when certain package elements have not been gathered and/or assembled.

Package Maintenance consists of the following processes which are required to manage the package post-assembly:

a. Package Staging for QC—Entails moving the package to a QC location and notifying the appropriate party that a package is ready for QC b. Package Staging for Delivery—Moves the assembled and, when necessary, quality checked package to a delivery staging location c. Package Retention—Enforces the purge/retention policies for packages. These policies may be client or partner specific.

d. Package Management—Enables administrators to manually access or purge packages.

3. User Interface

A user interface must exist to manage all aspects of package specifications from element type creation through assembling package specifications. The creation, review and publishing of package specifications are envisioned to be part of the overall on-boarding process.

Further, the Request and/or Admin/Partner portal should surface the status of each package element within a particular request enabling authorized users to see what stills needs to be gathered to allow Request fulfillment to proceed.

Finally, Package creation could potentially send notifications to parties responsible for providing package elements and performing package QC.

4. Interfaced Systems

The DBB needs to interface with the DAM or file system that houses the package elements required for the packages.

5. Multi-Tenant

The DBB needs to interface with partner DAM systems in order to gather necessary package elements. However, another option would be to provide a Partner portal which allowed direct ingestion of package elements into DBB.

APPENDIX 13 FINANCIAL PROCESSES

1. Overview

The DBB requires interaction with the financial systems of Sony and of Partners in order to provide cost estimates, facilitate financial approval, execute billing or cost transfer processes and to facilitate reconciliation of financial transactions where necessary.

The DBB model of financial processes must support the business relationship with SPE, an intercompany model, as well as a Partner model, a more traditional customer/vendor model. The self service concepts discussed in Appendix 3 Request Management may apply to both the intercompany and third party models as will be described. However, it is also considered necessary to include requirements for a DBB customer service layer to which Partners may provide traditional POs. This customer service layer would then interact with the DBB through the Request Module as described in the self service model.

All DBB financial models will allow for interfaces to either SPE or Partner financial systems in order to leverage upon the core functionality of these systems and to eliminate core financial requirements from the DBB proper wherever possible. The separation of the DBB as a content management and distribution platform from the requirements of GAAP or SOX governed financial systems is desirable.

Specific architecture options involving GOLD, Xytech MediaPulse and DADC's COM system are outlined in the System Architecture options below. This includes delineation of interface and implementation aspects of DBB.

2. Description

Financial Integration Concepts

The following sections document the functional components of the DBB financial flow. There are multiple options available to some of these components. These options are discussed at the end of the section.

Rate Card—As discussed in Appendix 6 Manufacturing Planning and elaborated upon in Appendix 5 Workflow Master Data and Appendix 7 Task Management, it is assumed that the DBB will either possess the capability to support a rate card within its architecture or will interface with a system that supports a rate card. This rate card must allow for various pricing scenarios common to content processing commerce. These scenarios must include but are not limited to the following:

a. Rate Card by Partner—The rate card must be configurable to provide unique pricing by partner, whether that partner be SPE or a third party. The rate card must support copy and modification of partner pricing and the application of rate changes by overall percentages or by individual price changes. Grouping and modification of large numbers of service prices is required.

b. Project Pricing—This pricing overrides a Partner's rate card when a specific deal is negotiated.

c. Pricing Types—The following pricing types must be supported.

Quantity Pricing—Includes the application of discounts for greater quantity.

Flat Fee Pricing—Includes services for which quantity or units are not considered in the computation of the price.

Minimum Quantity Pricing—A flat fee is charged until a minimum quantity is reached, then quantity or standard unit pricing is used.

d. Pricing Variables—The following variables must be used in Rate Card Mapping.

Quantity—Number of items created, e.g. five Mpeg2 files.

Units—Number of units that may or may not be multiplied by the quantity, e.g. 10 deliveries of 5 Mpeg2 files. Also used for any generic unit based service.

Run Time—The run time of content.

Source and Output Type—Type of source file, e.g. HD vs. SD source, output transcode format.

Order Type—Service level required and transaction type for the order, e.g. rush orders, non-billable.

Service Type—Type of service(s) executed for the request, e.g. transcode, 3:2 pull-down, etc. . . . .

Bit Rate—The Bit Rate of content.

File Size—The file size of content processed.

Billing Transactions—Through mapping between DBB Tasks and the rate card, Billing Transactions will be generated by DBB. These Transactions may be generated by the Manufacturing Plan in an automated fashion or through Modification of the Manufacturing Plan as described in Appendix 6 Manufacturing Planning, and Appendix 5 Workflow Master Data. However, the billing transactions will contain the cost estimate component of the Manufacturing Plan and will support invoicing or cost transfer processes.

Manufacturing Plan PO Interface—Within the Sony model the Manufacturing Plan, once approved by the Requestor in the DBB, will generate Billing Transactions supported by required financial data. It will then export this information to the WPF fulfillment system, GOLD. This interface will result in the creation of a Media Purchase Order in GOLD. Supporting information such as the SPE Title/Alpha ID is required, other financial information may be included in the Request Module design (e.g. Territory, Market) and will also be provided in the interface. In order to support Partner requirements, this interface will support standardized schema and web service functionality that may be configured and redeployed to multiple partners. Manufacturing instructions and Source Assets may be included in the interface for information purposes only. The GOLD PO (or Partner PO) created by the DBB is intended as a billing vehicle only and not as an instruction to perform work. Reporting the details of the distribution process will be a requirement of the DBB and not of the Partner PO system. Referential detail will be required in both systems.

Once the Manufacturing Plan is created and interface messages sent, the plan will remain on hold until approved through the interface. COFA approval of the Manufacturing Plan costs will be executed in GOLD (or Partner PO System). Once approved, a message will be sent back to the DBB releasing the Manufacturing Plan.

R1 requirements include the interface to GOLD and extensibility to third party PO systems. The design and build of a third party PO interface is not in scope for R1.

Manufacturing Execution and Cost Transfer Interface—Once COFA approval is received through the interface, the manufacturing plan will be executed. Substantive changes to the Manufacturing Plan that may be encountered during execution may result in a subsequent iteration of the interfaced PO. A revision may be sent and approved in order to support the billing process. When work has been completed, the DBB will send a message to GOLD executing the cost transfer function. This function will mirror the current manual process in the GOLD system by which an invoice record is created, approved and posted for export to SAP. Due to the inter-company nature of the transactions and the assurance by the interface that DBB Billing Transactions are equal to GOLD PO transactions, this process may be fully automated. The automation of this process is within the scope of R1, but it is assumed that the current GOLD Interface to SAP will be leveraged and a new interface to SAP is not required.

DADC Accounts Receivable-Regardless of the options selected for the Partner model, it is assumed that Billing Transactions within the DBB will be interfaced to the DADC Financial system, COM, for accounts receivable and general ledger purposes. In the SPE model these A/R transactions will be used to support reconciliation of cost transfers between SPE and DADC. In a Partner model, COM will provide standard invoicing and accounts receivable functions.

Financial Model Variables

Variables that may exist between the SPE Model and a Partner Model include but are not limited to the following:

Manufacturing Plan PO Interfacing—The interface of manufacturing estimates to Partners is an option but not a requirement of this model. As discussed briefly above, Partners may or may not directly use the Request Module. If they do not, they will deal with DADC Customer Service representatives who will interact directly with the DBB Request Module on behalf of the Partner. In this case, the need for a traditional Partner PO, prior to the execution of work may be required. This will be a more traditional customer/vendor interaction. While this process does not directly affect R1 requirements, the use case must be considered.

Billing/Cost Transfer—For a Partner the Manufacturing Execution and Cost Transfer Interface as described in the SPE model above will not be possible without a focused integration project that is not in scope for R1. It is assumed traditional invoice processing will be conducted by the DADC from the COM system. All internal interactions between Rate Card, Billing Transactions and COM A/R may remain as described.

System Architecture Options

Rate Card and Billing Transactions-Current options include the integration of a Xytech MediaPulse implementation that would stand alone within the DADC infrastructure. In this option, the rich rate card and billing functionality in the Xytech product would be leveraged to process financial transactions and to interface with GOLD on the SPE side and COM on the DADC side as described above.

A second option is that the Rate Card and Billing Transactions could also be maintained within the COM system. This would require COM to support all pricing related concepts and to interface with GOLD as described above.

The option of supporting the Rate Card in COM and the Billing Transactions in MediaPulse does not appear to be practical. If used purely for financial purposes, these systems would be considered support systems and DBB project requirements would be based upon the interfaces needed to support the financial model. Integration to these systems would be in scope for R1. This specifically excludes the implementation of a MediaPulse instance as a billing system only.

A third option is that Xytech MediaPulse would be used in core DBB content processing functions such as the Request Module, Manufacturing Planning, Task Management and Inventory Management. Should MediaPulse be presented as a solution in these areas, the Rate Card and Billing Transaction functions would be in scope due to their tight integration within the MediaPulse architecture.

3. User Interface

The ability to modify billing transactions at any point in the process flow is required. This interface is also covered in Appendix 6 Manufacturing Planning regarding the modification of a plan. It is stated specifically for clarity that operational personnel must be able to review and modify billing transactions prior to the finalization of a manufacturing plan or prior to any iteration of the Manufacturing Plan PO interface or for Partners, before invoicing.

4. Services

Depending upon final design, specifically regarding any use of Xytech MediaPulse, the DBB will require a service for the interface of Billing Transaction data. This service must access rate card information, apply mapping to estimated tasks and create resulting billing transactions. This service must be executable within the DBB purely for estimating purposes if necessary and not only to support distribution.

5. Interfaced Systems

Depending upon the resolution of system architecture options, a DBB interface to the GOLD system will be required to support COFA Approval and Cost Transfer activities described above. Whether MediaPulse is included as part of the DBB for operational purposes affects the nature of the interface to the DADC COM system. This interface may include the full scope of Rate Card, Billing Transactions, COFA Approval and Cost Transfer, or may simply require Billing Transactions to be interfaced from MediaPulse.

6. Multi-Tenant

Partner issues as they pertain to variations in the financial flow are addressed throughout the Section. In all areas where financial data is gathered or processed that the owning Partner be defined and that this Partner designation will allow the application of variable processing described herein.

The invention claimed is:

1. A distribution backbone system of a partner, the system comprising:
 a processor; and
 memory connected to the processor, the memory storing a computer program to digitally distribute movies to multiple clients which are companies, the computer program comprising instructions executable by the processor that cause the distribution backbone system to:
 receive a request for a movie, including an audio component and a video component, from a client, wherein the request includes a client profile, technical specifications and delivery of the movie,
wherein the client profile includes metadata requirements of the client for the delivery of the movie and preferences of the client which are client specific requirements that guide selection of source assets, including any transformations required in order to provide metadata in a preferred format for the client,
wherein the source assets are categories of the audio component and the video component of the movie available within the distribution backbone system,
wherein the technical specifications define variables and requirements needed to support an automated workflow to produce an output for the delivery of the movie,
wherein the technical specifications apply to multiple clients, and
wherein modifications of the technical specifications by the client result in a revision of the technical specifications only for the client, while modifications of the technical specifications by the partner result in the modifications to be propagated to all clients associated to the technical specifications;
perform inventory and analysis of the source assets by iteratively progressing through the client profile to produce the output which fulfills the request for the movie according to the preferences;
classify the source assets according to the technical specifications and the metadata requirements of the client;
perform a capability mapping including mapping which uses a series of rules to map the source assets to the technical specifications,
wherein the series of rules defines work items including execution steps,
wherein the execution steps transform the source assets according to the technical specifications to produce the output; and
deliver the output in response to the request for the movie.

2. The system of claim 1, wherein a plurality of client profiles is set up for the client to represent (a) multiple business models for the client and (b) requirements that vary by territory.

3. The system of claim 1, wherein the received request for the movie is generated by operations responsible for fulfillment of the movie to licensees.

4. The system of claim 1, wherein the computer program further comprises instructions executable by the processor that cause the distribution backbone system to perform an automated management of the movie including file management, transcoding, and packaging, which are controlled by standardized data interfaces.

5. The system of claim 1, wherein the computer program further comprises instructions executable by the processor that cause the distribution backbone system to perform analysis to identify information regarding an identification of the movie, the client to be serviced, and terms of servicing including a due date.

6. A non-transitory computer-readable storage medium storing a computer program to enforce a license for digitally distributing media content by a partner to multiple clients which are companies, the computer program comprising executable instructions that cause a computer to:
receive a request for a movie, including an audio component and a video component, from a client,
wherein the request includes a client profile, technical specifications and delivery of the movie,
wherein the technical specifications apply to multiple clients, and
wherein modifications of the technical specifications by the client result in a revision of the technical specifications only for the client, while modifications of the technical specifications by the partner result in the modifications to be propagated to all clients associated to the technical specifications,
wherein the client profile includes metadata requirements of the client for the delivery of the movie and preferences of the client which are client specific requirements that guide selection of source assets, including any transformations required in order to provide metadata in a preferred format for the client,
wherein the source assets are categories of the audio component and the video component of the movie available within the distribution backbone system,
wherein the technical specifications define variables and requirements needed to support an automated workflow to produce an output for the delivery of the movie;
perform inventory and analysis of the source assets by iteratively progressing through the client profile to produce the output which fulfills the request for the movie according to the preferences;
classify the source assets according to the technical specifications and the metadata requirements of the client;
perform a capability mapping including mapping which uses a series of rules to map the source assets to the technical specifications,
wherein the series of rules defines work items including execution steps,
wherein the execution steps transform the source assets according to the technical specifications to produce the output; and
deliver the output in response to the request for the movie.

7. The non-transitory computer-readable storage medium of claim 6, wherein a plurality of client profiles is set up for the client to represent (a) multiple business models for the client and (b) requirements that vary by territory.

8. The non-transitory computer-readable storage medium of claim 6, wherein the received request for the movie is generated by operations responsible for fulfillment of the movie to licensees.

9. The non-transitory computer-readable storage medium of claim 6, wherein the computer program further comprises instructions executable by the processor that cause the distribution backbone system to perform an automated management of the movie including file management, transcoding, and packaging, which are controlled by standardized data interfaces.

10. The non-transitory computer-readable storage medium of claim 6, wherein the computer program further comprises instructions executable by the processor that cause the distribution backbone system to perform analysis to identify information regarding an identification of the movie, the client to be serviced, and terms of servicing including a due date.

11. The non-transitory computer-readable storage medium of claim 6, further comprising
ranking the preferences of the client and the technical specifications that express a range of deliverables that the client may accept.

* * * * *